US011971508B2

(12) United States Patent
Hao et al.

(10) Patent No.: US 11,971,508 B2
(45) Date of Patent: *Apr. 30, 2024

(54) VARYING WAVEFORMS ACROSS FRAMES IN FREQUENCY-MODULATED CONTINUOUS-WAVE (FMCW) LIDAR SYSTEMS

(71) Applicant: Aptiv Technologies AG, Schaffhausen (CH)

(72) Inventors: Chenghui Hao, Cambridge, MA (US); Michael DeLaus, Boston, MA (US); Geng Fu, Belmont, MA (US); Denis Rainko, Essen (DE)

(73) Assignee: Aptiv Technologies AG, Schaffhausen (CH)

( * ) Notice: Subject to any disclaimer, the term of this patent is extended or adjusted under 35 U.S.C. 154(b) by 896 days.

This patent is subject to a terminal disclaimer.

(21) Appl. No.: 16/924,079

(22) Filed: Jul. 8, 2020

(65) Prior Publication Data

US 2022/0011417 A1    Jan. 13, 2022

(51) Int. Cl.
*G01S 7/4911* (2020.01)
*G01S 7/4912* (2020.01)
(Continued)

(52) U.S. Cl.
CPC .......... *G01S 7/4913* (2013.01); *G01S 7/4911* (2013.01); *G01S 7/4917* (2013.01); *G01S 17/34* (2020.01)

(58) Field of Classification Search
CPC .... G01S 7/4913; G01S 7/4911; G01S 7/4917; G01S 17/34; G01S 7/493; G01S 17/931; G01S 17/32; G01S 17/58
(Continued)

(56) References Cited

U.S. PATENT DOCUMENTS 4,594,000 A    6/1986    Falk et al.
7,339,518 B2   3/2008    Kazuma et al.
(Continued)

FOREIGN PATENT DOCUMENTS

EP    2618179    7/2013
EP    3822658    5/2021
(Continued)

OTHER PUBLICATIONS

"Extended European Search Report", EP Application No. 21152779.1, dated Jul. 15, 2021, 8 pages.
(Continued)

*Primary Examiner* — Daniel L Murphy
(74) *Attorney, Agent, or Firm* — Harness, Dickey & Pierce, P.L.C.

(57) ABSTRACT

This document describes techniques and systems to vary waveforms across frames in lidar systems. The described lidar system transmits signals with different waveforms for the same pixel of consecutive frames to avoid a return signal overlapping with a noise spike or a frequency component of another return signal. The different waveforms can be formed using different frequency modulations, different amplitude modulations, or a combination thereof for the same pixel of consecutive frames. The lidar system can change the waveform of the transmit signal for the same pixel of a subsequent frame automatically or in response to determining that a signal-to-noise ratio of the return signal of an initial frame is below a threshold value. In this way, the lidar system can increase the signal-to-noise ratios in return signals. These improvements allow the lidar system to increase its accuracy in determining the characteristics of objects that reflected the return signals.

20 Claims, 8 Drawing Sheets

(51) Int. Cl.
  *G01S 7/4913* (2020.01)
  *G01S 17/34* (2020.01)

(58) Field of Classification Search
  USPC .................................................... 356/5.09
  See application file for complete search history.

(56) References Cited

U.S. PATENT DOCUMENTS

| | | | |
|---|---|---|---|
| 2016/0123718 | A1 | 5/2016 | Roos et al. |
| 2016/0377721 | A1 | 12/2016 | Lardin et al. |
| 2017/0146648 | A1 | 5/2017 | Lim et al. |
| 2018/0284247 | A1 | 10/2018 | Campbell et al. |
| 2019/0018110 | A1 | 1/2019 | Kremer et al. |
| 2019/0025431 | A1 | 1/2019 | Satyan et al. |
| 2019/0086518 | A1 | 3/2019 | Hallstig et al. |
| 2019/0310372 | A1 | 10/2019 | Crouch et al. |
| 2021/0149031 | A1 | 5/2021 | Dietz et al. |
| 2021/0247490 | A1 | 8/2021 | Fu |
| 2022/0003854 | A1 | 1/2022 | Delaus et al. |

FOREIGN PATENT DOCUMENTS

| | | |
|---|---|---|
| EP | 3822659 | 5/2021 |
| WO | 2018067158 | 4/2018 |
| WO | 2018160240 | 9/2018 |

OTHER PUBLICATIONS

"Extended European Search Report", EP Application No. 20206998. 5, dated Jul. 28, 2021, 13 pages.

"Extended European Search Report", EP Application No. 19209595. 8, dated Sep. 28, 2020, 13 pages.

Baghmisheh, "Chip-scale Lidar", Jan. 19, 2017, 46 pages.

Zhang, et al., "Laser frequency sweep linearization by iterative learning pre-distortion for FMCW LiDAR", Mar. 2019, 10 pages.

Gao, et al., "Complex-Optical-Field Lidar System for Range and Vector Velocity Measurement", Optics Express, vol. 20, Issue 23, pp. 25867-25875; Retrieved from https://doi.org/10.1364/OE.20. 025867, Nov. 1, 2012, 9 pages.

Onori, et al., "Coherent Interferometric Dual-Frequency Laser Radar for Precise Range/Doppler Measurement", Journal of Lightwave Technology, vol. 34, Issue: 20, Oct. 15, 2016; Retrieved from https://doi.org/10.1109/JLT.2016.2589538, 2016, 6 pages.

Pursuant to MPEP § 2001.6(b) the applicant brings the following co-pending application to the Examiner's attention: U.S. Appl. No. 16/920,179.

"Extended European Search Report", EP Application No. 21182491. 7, dated Nov. 30, 2021, 9 pages.

"Extended European Search Report", EP Application No. 21183613. 5, dated Dec. 2, 2021, 9 pages.

Gao, "Frequency-modulated Continuous-wave Lidar using I/Q Modulator for Simplified Heterodyne Detection", Optic Letters / vol. 37, No. 11, Jun. 1, 2012, pp. 2022-2024.

Kakuma, "Frequency-Modulated Continuous-Wave Laser Radar Using Dual Vertical-Cavity Surface-Emitting Laser Diodes for Real-Time Measurements of Distance and Radial Velocity", Optical Review, 24, 39-46, Dec. 3, 2016, 8 pages.

Khader, et al., "An Introduction to Automotive LIDAR", Texas Instruments Incorporated, Oct. 2018, 7 pages.

Mateo, "Applications of High Resolution and Accuracy Frequency Modulated Continuous Wave Ladar", Thesis—Montana State University, Nov. 2014, 130 pages.

Xu, et al., "Simultaneous Real-Time Ranging and Velocimetry via a Dual-Sideband Chirped Lidar", IEEE Photonics Technology Letters, vol. 29, Issue: 24, Dec. 2017, 4 pages.

"Foreign Office Action", EP Application No. 21182491.7, dated Dec. 22, 2022, 9 pages.

Kim, et al., "A Hybrid 3D Lidar Imager Based on Pixel-by-Pixel Scanning and DS-OCDMA", Proceedings of the SPIE, vol. 9751, Mar. 2016, 8 pages.

VARYING WAVEFORMS ACROSS FRAMES IN FREQUENCY-MODULATED CONTINUOUS-WAVE (FMCW) LIDAR SYSTEMS

BACKGROUND

Automotive lidar systems use laser signals to determine the speed and distance of stationary and moving objects (e.g., other vehicles, pedestrians, obstacles). Frequency-modulated continuous-wave (FMCW) lidar is a promising technology for next-generation autonomous-driving sensors because it allows for strong signal-to-noise ratio (SNR), immunity to ambient light, and direct measurement of range and range rate for nearby objects.

FMCW lidar systems can measure range and range-rate information by comparing a reflected return signal to its corresponding emitted laser signals. In some situations, the lidar system can have noise spikes that overlap with the return signals. The noise spikes can arise from external and internal sources. External noise sources can include sunlight, stray laser signals from other lidar systems, and other return signals. Internal noise sources can include noise of the receiver or detector and thermal noise of components with the lidar system. It can be challenging for the lidar system to separate the noise spike from the return signal. As such, the overlapping noise can reduce the accuracy of the FMCW lidar system, which can make the lidar system unsuitable for many automotive applications.

SUMMARY

This document describes techniques and systems to vary waveforms across frames in FMCW lidar systems. For example, this document describes a method for varying waveforms across frames in FMCW lidar systems. The described method transmits and receives a signal with different waveforms for the same pixel of consecutive frames. The waveform comprises a frequency modulation, an amplitude modulation, or a combination thereof. The waveform of the transmit signal for a subsequent frame has a different frequency modulation or amplitude modulation than the waveform of the transmit signal for an initial frame of two consecutive frames. The method determines a beat frequency of the return signal for each frame by mixing the return signal with the transmit signal. The center frequency or a sideband frequency of the beat frequency of the return signal for the subsequent frame is different than a center frequency or a sideband frequency of the beat frequency of the return signal for the initial frame, respectively.

This document also describes lidar systems, including lidar systems comprising means for performing the above-summarized method or lidar systems comprising computer-readable storage media storing instructions that, when executed by a processor of a lidar system, cause the lidar system to perform the above-summarized method and other methods set forth herein.

This summary introduces simplified concepts for varying waveforms across frames in FMCW lidar systems, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of varying waveforms across frames in an FMCW lidar system are described in this document with reference to the following figures. The same numbers are often used throughout the drawings to reference like features and components:

FIG. 3-1 illustrates an example operation of the described FMCW lidar system that varies waveforms across frames;

FIG. 3-2 illustrates a frequency-time plot of transmit signals and return signals and an amplitude-time plot of return signals for multiple pixels of the described FMCW lidar system;

FIGS. 5-1 and 5-2 illustrate example operations of a transmitter, receiver, and processor of the described FMCW lidar system.

DETAILED DESCRIPTION

Overview

Figure 1:
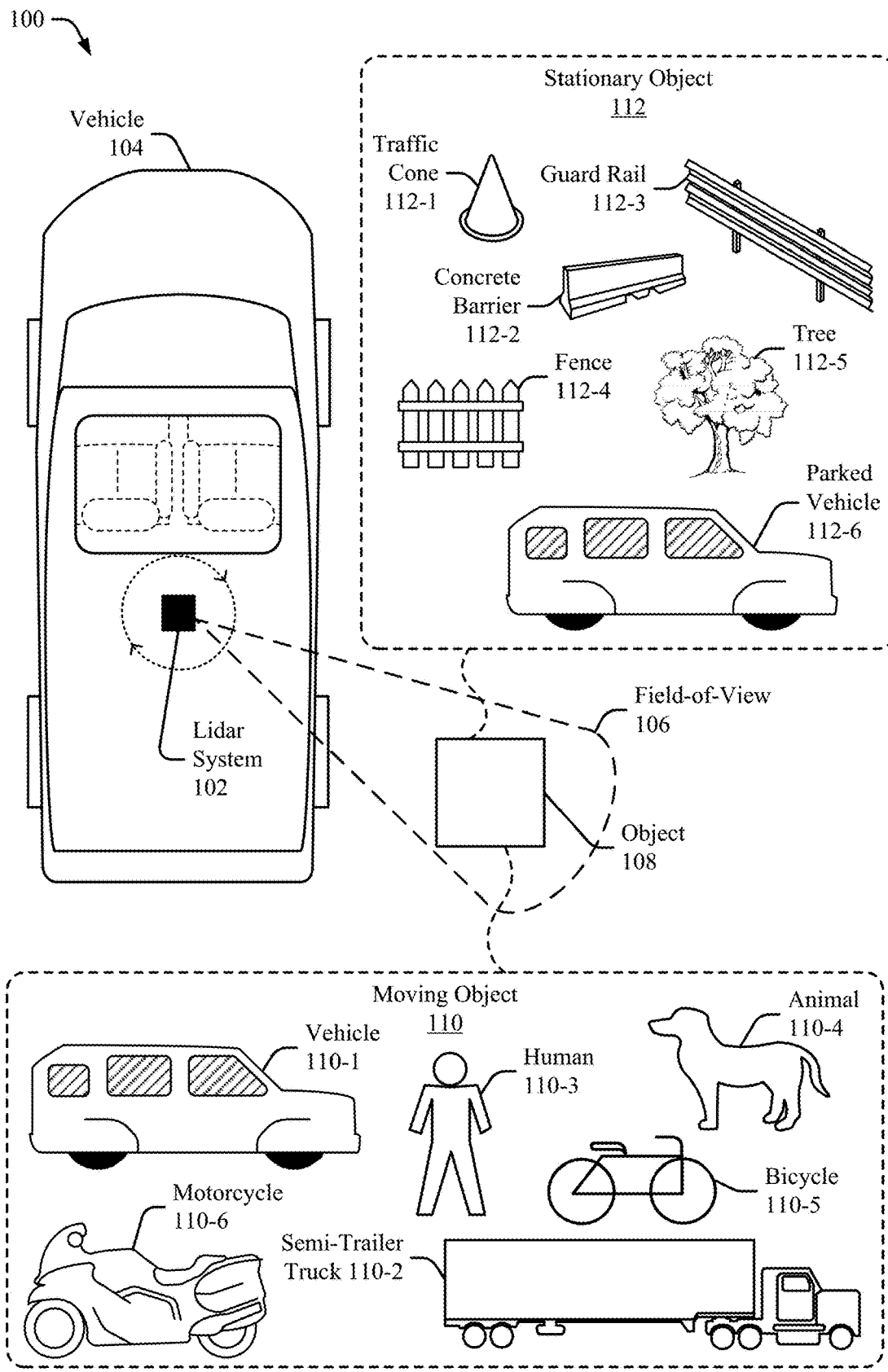
FIG. 1 illustrates an example environment in which an FMCW lidar system with varying waveforms across frames is implemented.

Automotive lidar systems are an important sensing technology on which some vehicle-based systems rely to acquire critical information about the surrounding environment. A lidar system has a field-of-view that represents a volume of space within which it looks for objects. The field-of-view is composed of many pixels (e.g., one million pixels). The time it takes the lidar system to scan each pixel (e.g., collect information for all the pixels) within the field-of-view is a frame. While scanning each pixel in a sequence of frames and depending on characteristics of the transmitted signals, the lidar system can determine range and range-rate information (e.g., distance and radial velocity, respectively) and angular information of nearby objects.

An FMCW lidar system scans each pixel by emitting a frequency-modulated laser signal and by detecting a return signal. In some situations, the lidar system can include noise spikes that overlap with portions of the return signals. As described above, the noise spikes can arise from external and internal sources. External noise sources can include sunlight and stray laser signals from other lidar systems. Internal noise sources can include semiconductor noise and thermal noise of components with the lidar system. It is difficult for some lidar systems to separate the noise spike from the return signal. These lidar systems, thus, can include noise spikes that overlap with the return signal, which decreases the signal-to-noise ratio of the return signal. The decreased signal-to-noise ratio reduces the accuracy of these lidar systems, making them less suited for many automotive applications.

In other situations, the lidar system can receive multiple return signals corresponding to different pixels at the same time. It is challenging for some lidar systems to separate the return signals from one another. Some FMCW lidar systems include a delay time in transmitting signals between each pixel to isolate return signals and avoid ambiguities in associating return signals with their corresponding pixels. This delay varies (e.g., one to ten microseconds) based on the desired detection range and confidence. The additional time between transmit signals decreases the frame rate of these lidar systems. As such, the reduced frame rate can reduce the reaction time of the lidar system, which can make it unsuitable for many automotive applications.

This document describes techniques and systems to vary waveforms across frames in FMCW lidar systems. The techniques and systems transmit and receive signals with different waveforms for the same pixel of consecutive frames. The different waveforms avoid a return signal overlapping with a noise spike or a frequency component of another return signal. In particular, the waveform applied to the pixel of the initial frame has a different modulation than the waveform applied to the same pixel of the subsequent frame. The different modulation can be a different frequency modulation, amplitude modulation, phase modulation, or a combination thereof. The techniques and systems can change the modulation of the transmit signal for the same pixel of a subsequent frame automatically or in response to determining that a signal-to-noise ratio of the return signal of an initial frame of consecutive frames is below a threshold value. In addition, the modulation can be changed for each pixel in the subsequent frame or for a subset of pixels in the subsequent frame.

The techniques and systems determine the beat frequency of a return signal by mixing the return signal with its corresponding transmit signal in both the initial frame and the subsequent frame. The beat frequency of the return signal determined in the subsequent frame can be compared with the beat frequency of the return signal determined in the initial frame. The techniques and systems can also determine a characteristic of an object that reflected the return signal based on the beat frequency of the return signal for both the initial frame and the subsequent frame. The described FMCW lidar system increases the signal-to-noise ratios in return signals by varying the waveform of transmit signals for the same pixels of consecutive frames. The increased signal-to-noise ratios increase the accuracy of the range, range rate, and angular information determined by the described FMCW lidar system.

This document also describes techniques and systems to improve confidence in associating return signals with their corresponding pixels by varying the waveforms of transmit signals for consecutive pixels across consecutive frames. The techniques and systems transmit signals with different amplitude modulations for consecutive pixels of an initial frame of consecutive frames. The techniques and systems then receive return signals and compare them in the frequency domain to at least two template signals. The template signals include the waveforms of an initial pixel and a subsequent pixel of the two consecutive pixels, respectively. The techniques and systems determine, based on the comparison in the frequency domain to the template signals, the pixels to which the return signals correspond. In some situations, the techniques and systems can change the waveforms of the transmit signals for the same pixels of the subsequent frame to resolve ambiguities in associating the return signals to their corresponding pixels. In the subsequent frame, the techniques and systems can change the frequency modulation, the amplitude modulation, or a combination thereof. The different waveforms can improve the confidence of the described lidar system in resolving return signals among pixels. With an improved confidence in resolving detections, the described techniques and systems can allow the lidar system to reduce time between transmit signals and operate at faster frame rates. In this way, a vehicle system (e.g., a collision-avoidance system) can obtain lidar data more accurately and more quickly, which improves its analysis of the surrounding environment.

These are just two examples of how the described techniques and systems vary waveforms across frames in FMCW lidar systems. This document describes other examples and implementations. This document now describes example operating environments, devices, and methods.

Operating Environment

FIG. 1 illustrates an example environment 100 in which the described FMCW lidar system 102 can be implemented. The FMCW lidar system 102 (referred to as "lidar system 102") transmits laser light with varied waveforms across frames. In the depicted environment 100, the lidar system 102 is mounted to, or integrated within, a vehicle 104. The lidar system 102 can detect one or more objects 108 that are in proximity to the vehicle 104. Although illustrated as a car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow or include a trailer or other attachments. In general, vehicle manufacturers can mount the lidar system 102 to any moving platform, including moving machinery or robotic equipment.

Figures 1, 3:
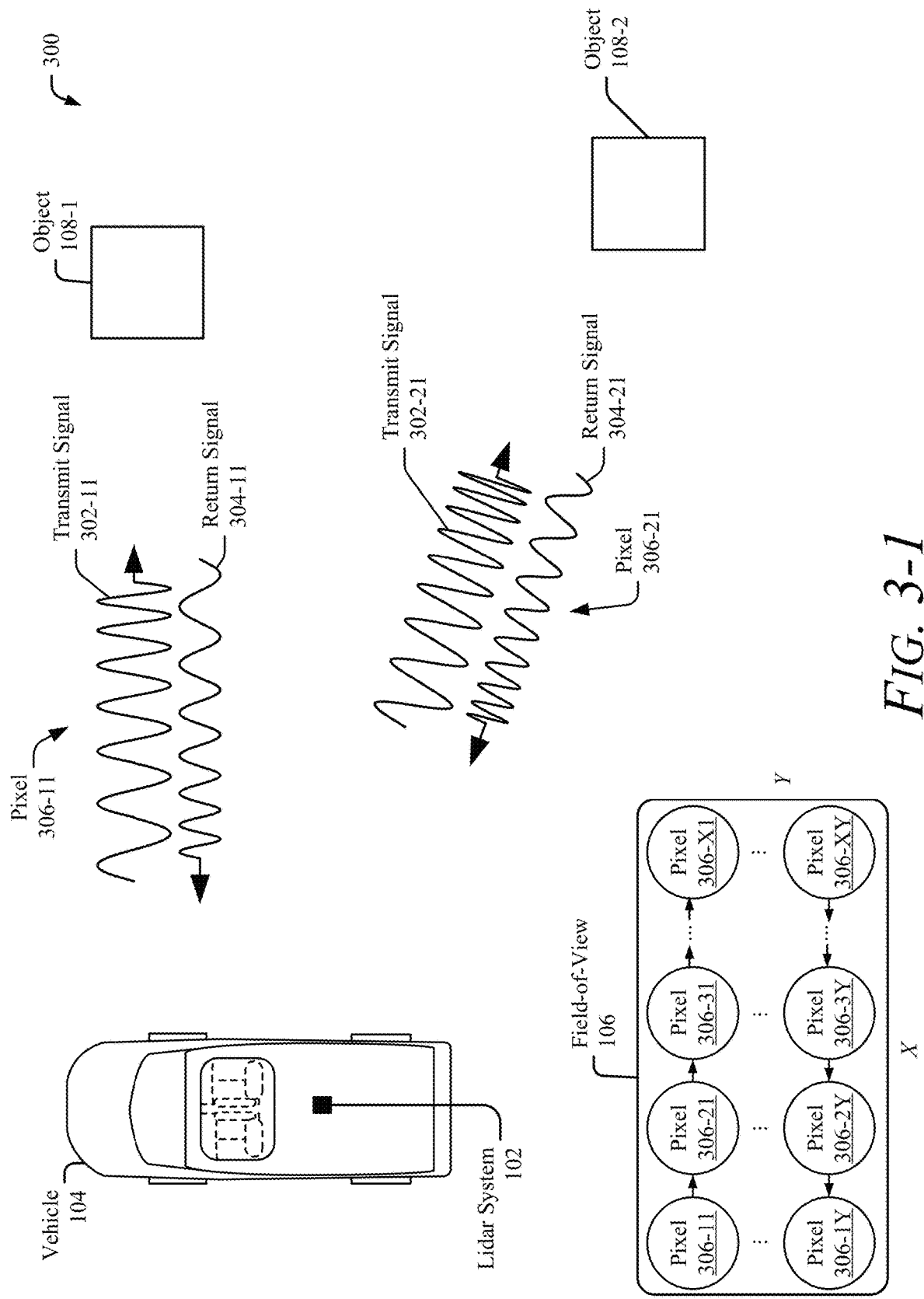
Figures 2, 3:
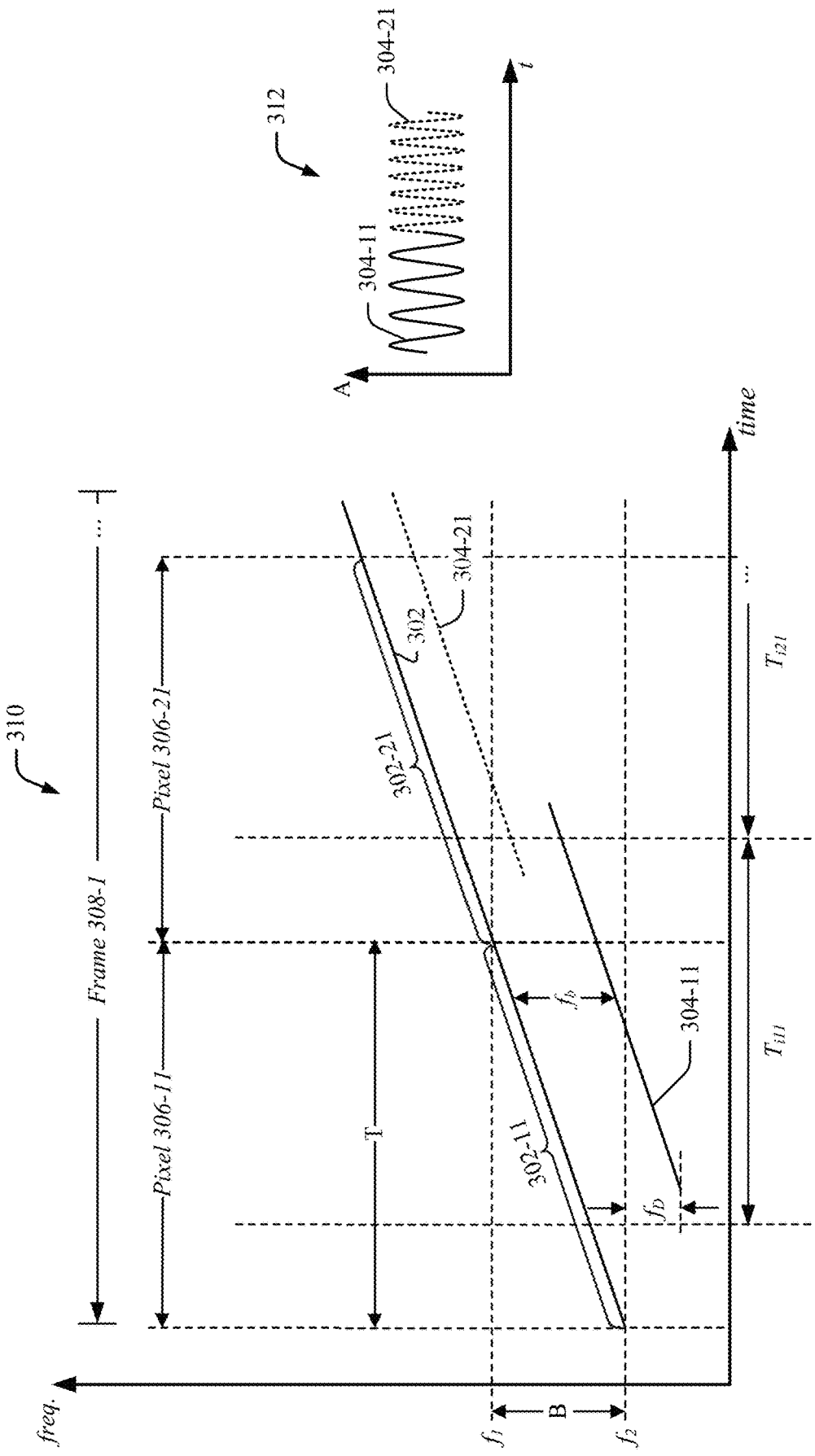

In the depicted implementation, the lidar system 102 is mounted on the roof of the vehicle 104 and provides a field-of-view 106 illuminating the object 108. The lidar system 102 divides the field-of-view 106 into pixels (as illustrated in FIG. 3-1). The lidar system 102 can project the field-of-view 106 from any exterior surface of the vehicle 104. For example, vehicle manufacturers can integrate the lidar system 102 into a bumper, side mirror, or any other interior or exterior location where distance and radial velocity of object 108 require detection. In some cases, the vehicle 104 includes multiple lidar systems 102, such as a first lidar system 102 and a second lidar system 102 that together provide a larger field-of-view 106. In general, vehicle manufacturers can design the locations of the one or more lidar systems 102 to provide a particular field-of-view 106 that encompasses a region of interest in which the object 108 may be present. Example field-of-views 106 include a 360-degree field-of-view, one or more 180-degree fields of view, one or more 90-degree fields of view, and so forth, which can overlap or be combined into a field-of-view 106 of a particular size.

The object 108 is composed of one or more materials that reflect lidar laser signals. Depending on the application, the object 108 can represent a target of interest. In some cases, the object 108 is a moving object 110, such as another vehicle 110-1, a semi-trailer truck 110-2, a human 110-3, an animal 110-4, a bicycle 110-5, or a motorcycle 110-6. In other cases, the object 108 represents a stationary object 112, such as a traffic cone 112-1, a concrete barrier 112-2, a guard rail 112-3, a fence 112-4, a tree 112-5, or a parked vehicle 112-6. The stationary object 112 can be continuous (e.g., the concrete barrier 112-2, the guard rail 112-3) or discontinuous (e.g., the traffic cone 112-1) along a portion of the road.

In general, the lidar system 102 is different than some FMCW lidar systems because it uses different waveforms for the same pixel of consecutive frames to avoid a return signal overlapping with a noise spike or frequency component of another return signal associated with another pixel. The different waveforms can be formed using different amplitude modulations and/or different frequency modulations for the same pixel of consecutive frames. The lidar system can change the waveform of the transmit signal for the same pixel of a subsequent frame automatically or in response to determining that a signal-to-noise ratio of the return signal of an initial frame of consecutive frames is below a threshold value.

The lidar system 102 determines a beat frequency of a return signal by mixing the return signal with its corresponding transmit signal in both the initial frame and the subsequent frame of the consecutive frames. The lidar system 102 compares the beat frequency of the return signal for the subsequent frame with the beat frequency of the return signal for the initial frame. A characteristic of the object 108 that reflected the return signal is identified based on the beat frequency of the return signal. Example characteristics include range and range-rate information or angular information for the object 108. The comparison of the beat frequency determined across the consecutive frames increases the confidence of the characteristic of the object 108 calculated by the lidar system 102. The lidar system 102 can output one or more of these characteristics to automotive applications (e.g., autonomous-driving systems, driver-assistance systems). By using different waveforms for the same pixel of consecutive frames, the lidar system 102 increases the signal-to-noise ratios of processed return signals. The increased signal-to-noise ratios can also allow the lidar system 102 to associate return signals with their corresponding pixels with increased confidence. As a result, the lidar system 102 can also scan more frames in less time than other lidar systems that must extend the total time for each pixel to isolate return signals.

Figure 2:
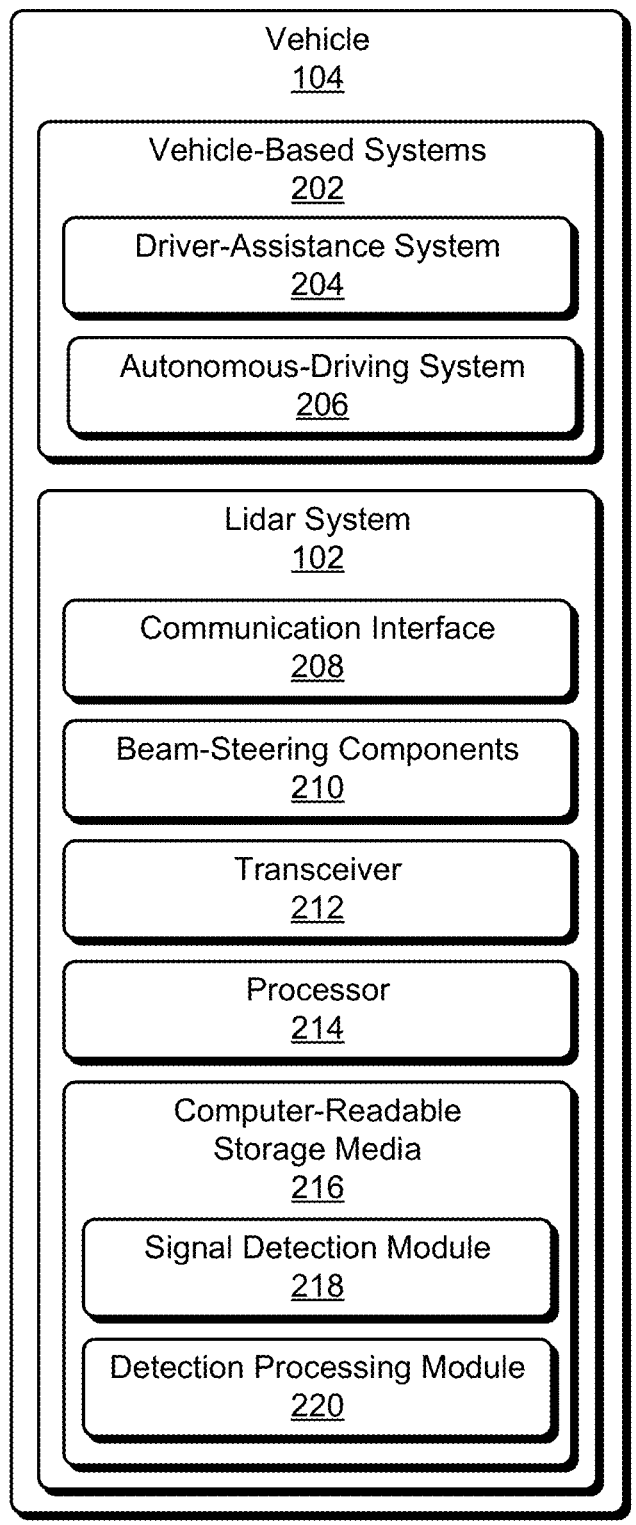
FIG. 2 illustrates an example implementation of the described FMCW lidar system as part of a vehicle.

FIG. 2 illustrates the lidar system 102 as part of the vehicle 104. The vehicle 104 also includes vehicle-based systems 202 that rely on data from the lidar system 102, such as a driver-assistance system 204 and an autonomous-driving system 206. Generally, the vehicle-based systems 202 use lidar data provided by the lidar system 102 to perform a function. For example, the driver-assistance system 204 provides blind-spot monitoring and generates an alert that indicates a potential collision with an object 108 that is detected by the lidar system 102. In this case, the lidar data from the lidar system 102 indicates when it is safe or unsafe to change lanes.

As another example, the driver-assistance system 204 suppresses alerts responsive to the lidar system 102, indicating that the object 108 represents a stationary object 112, such as a road barrier. In this way, the driver-assistance system 204 can avoid annoying the driver with alerts while the vehicle 104 is driving next to the road barrier. Suppressing alerts can also be beneficial in situations in which reflections from the road barrier generate false detections that appear to be moving objects. By suppressing the alerts, these false detections will not cause the driver-assistance system 204 to alert the driver.

The autonomous-driving system 206 may move the vehicle 104 to a particular location on the road while avoiding collisions with objects 108 detected by the lidar system 102. The lidar data provided by the lidar system 102 can provide information about distance, angular position, and radial velocity of the objects 108 to enable the autonomous-driving system 206 to perform emergency braking, perform a lane change, or adjust the speed of the vehicle 104.

The lidar system 102 includes a communication interface 208 to transmit the lidar data to the vehicle-based systems 202 or another component of the vehicle 104. The communication interface 208 can transmit the data over a communication bus of the vehicle 104, for example, when the individual components of the lidar system 102 are integrated within the vehicle 104. In general, the lidar data provided by the communication interface 208 is in a format usable by the vehicle-based systems 202. In some implementations, the communication interface 208 may provide information to the lidar system 102, such as the speed of the vehicle 104 or whether a turn blinker is on or off. The lidar system 102 can use this information to configure itself appropriately. For example, the lidar system 102 can determine an absolute speed of the object 108 by compensating for the speed of the vehicle 104. Alternatively, the lidar system 102 can dynamically adjust the field-of-view 106 based on whether a right-turn blinker or a left-turn blinker is on.

The lidar system 102 also includes beam-steering components 210 and a transceiver 212. The beam-steering components 210 can include mechanical and/or electromechanical components to shape or steer lidar laser signals and for detecting lidar reflections. Using the beam-steering components 210, the lidar system 102 can steer and shape lidar signals through various optical beamforming techniques.

The lidar system 102 can include mechanical beam-steering components. In which case, the beam-steering components 210 include high-grade optics and a rotating assembly to create a wide (e.g., three-hundred-sixty degree) field-of-view 106. Alternatively, the lidar system 102 can be a solid-state lidar system, such as a microelectromechanical-system (MEMS)-based lidar system, a flash-based lidar system, or an optical phased-array lidar system. When configured as a solid-state lidar system, the beam-steering components 210 do not include a rotating mechanical component and may, therefore, be less expensive than a mechanical-scanning lidar system. The lidar system 102 can include multiple solid-state lidar modules, with each module positioned at a different location on the vehicle 104. For example, the modules may be on the front, rear, or sides of the vehicle 104 and, when combined, create a single point cloud. In such an arrangement, the lidar system 102 has a field-of-view 106 that is similar to the field-of-view 106 of a mechanical-scanning lidar system.

The transceiver 212 includes components, circuitry, and logic for emitting lidar signals via the beam-steering components 210 and receiving reflected lidar signals via the beam-steering components 210. The transceiver 212 can include a transmitter and a receiver integrated together into a single package or it can include the transmitter and receiver as separate components. The transceiver 212 and its operation is further described with respect to FIGS. 4, 5-1, and 5-2.

The lidar system 102 also includes one or more processors 214 and computer-readable storage media (CRM) 216. The CRM 216 includes a signal detection module 218 and a detection processing module 220. The signal detection module 218 and the detection processing module 220 can be implemented using hardware, software, firmware, or a combination thereof. In this example, the processor 214 executes instructions for implementing the signal detection module 218 and the detection processing module 220. Together, the signal detection module 218 and the detection processing module 220 enable the processor 214 to control the transmission of lidar signals, process responses via the beam-steering components 210, and generate lidar data for the vehicle-based systems 202.

The signal detection module 218 analyzes return signals provided by the transceiver 212 and generates data that is usable by the detection processing module 220. The signal detection module 218 analyzes the return signals from different frames and maps the return signals to their corresponding pixels within each frame. The signal detection module 218 can also provide feedback to the transceiver 212 to configure the transmission of lidar signals. For example, the signal detection module 218 can provide modulation control data to the transceiver 212 to control the modulation (e.g., frequency, amplitude, phase) of the transmit signals among pixels of the of the field-of-view 106 and across frames.

The detection processing module 220 analyzes the data output by the signal detection module 218 and produces lidar data for the vehicle-based systems 202. Example types of lidar data include a Boolean value that indicates whether a detection from the object 108 is present within a particular region of interest, a number that represents a characteristic of the object 108 (e.g., range, range rate, distance, radial velocity, and angular information), or a value that indicates the type of object 108 (e.g., a moving object 110, a stationary object 112).

FIG. 3-1 illustrates an example operation of the lidar system 102 that varies waveforms across frames. For reference, the lidar system 102 includes the field-of-view 106, which shows the pixels 306-11, 306-21, 306-31, . . . , 306-X1, . . . , 306-XY, 306-3Y, 306-2Y, 306-1Y, and all other pixels scanned during a frame. The pixels 306 are shown arranged in an X-pixel-wide-by-Y-pixel-high grid and are scanned individually in the order indicated by the arrows, one row (or column) at a time.

In the environment 300 of FIG. 3-1, objects 108-1 and 108-2 (collectively, the objects 108) are located at a particular range and angle from the lidar system 102. To detect the objects 108, the lidar system 102 transmits a transmit signal 302. As an example, the lidar system 102 emits a transmit signal 302-11 (the "first transmit signal"), which is a portion of the transmit signal 302, in the pixel 306-11. The transmit signal 302-11 has a first waveform.

Similarly, the lidar system 102 emits the transmit signal 302-21 (the "third transmit signal") in the pixel 306-21. The transmit signals 302-11 and 302-21 are collectively the transmit signal 302. As described in more detail with respect to FIG. 4, the transmit signal 302-21 has a third waveform that can have a different modulation (e.g., a different amplitude modulation) than the first waveform. As described in more detail with respect to FIGS. 5-1 and 5-2, the first waveform can be reused for the transmit signal 302 of another pixel 306 within a frame, but the waveforms used for the transmit signals of consecutive pixels can be different. The transmit signal 302 (e.g., the transmit signal 302-11 and the transmit signal 302-21) are emitted in a continuous sequence (e.g., are part of the same transmit signal) and are not discrete signals.

Each transmit signal 302 can include one or more chirps. A chirp is a portion of the transmit signal 302 in which the frequency increases (up-chirp), decreases (down-chirp), or remains constant (flat-chirp) over time. In the depicted example, the lidar system 102 employs a single up-chirp for each transmit signal 302 within a pixel 306, with the frequency of each chirp linearly increasing over time. In other words, the center frequencies of the transmit signals 302-11 and 302-21 are different, but the transmit signals 302-11 and 302-21 have the same frequency slope. In other cases, the lidar system 102 can apply a triangle-slope cycle with two chirps for each transmit signal 302 within a pixel 306, in which the frequency of each chirp alternates between linearly increasing and linearly decreasing over time. In general, the lidar system 102 can tailor the number of chirps for each of the transmit signals 302, the chirp patterns of the chirps (e.g., combinations of up-chirps, down-chirps, flat-chirps, center frequencies, frequency slopes) and the transmission characteristics of the chirps (e.g., bandwidth, center frequency, duration, transmit power) to achieve a particular detection range, range resolution, or Doppler resolution.

As discussed above, the beam-steering components 210 steer each transmit signal 302 so that the lidar system 102 sequentially scans the pixels 306 within the field-of-view 106. In other words, the lidar system 102 transmits the transmit signals 302-11 and 302-21 in a continuous sequence and not as a series of discrete signals. A frame (not shown in FIG. 3-1) represents the time it takes to scan all the individual pixels 306 within the field-of-view 106.

At least a part of the transmit signal 302-11 is reflected by the object 108-1. The reflected portion represents a return signal 304-11 (the first return signal). The lidar system 102 receives the return signal 304-11 and processes the return signal 304-11 to extract lidar data regarding the object 108-1 for the vehicle-based systems 202. As depicted, the amplitude of the return signal 304-11 is smaller than the amplitude of the transmit signal 302-11 due to losses incurred during propagation and reflection.

Similarly, at least a portion of the transmit signal 302-21 is reflected by the object 108-2. The lidar system 102 receives the return signal 304-21 (the third return signal) and processes it to extract lidar data regarding the object 108-2 for the vehicle-based systems 202. The return signals 304-11 and 304-21 are collectively the return signal 304.

At the lidar system 102, the return signals 304-11 and 304-21 represent a delayed version of the transmit signals 302-11 and 302-21, respectively. The amount of delay is proportional to the range (e.g., distance) from the objects 108-1 and 108-2 to the lidar system 102. For example, this delay represents the time it takes the transmit signal 302-11 to propagate from the lidar system 102 to the object 108-1 and for the return signal 304-11 to travel back to the lidar system 102. If the objects 108 or the lidar system 102 are moving, the return signals 304 are shifted in frequency relative to the transmit signal 302 due to the Doppler effect. This shift in the frequency of the return signals 304 is known as the Doppler frequency. In other words, characteristics of the return signals 304 are dependent upon motion of the objects 108, respectively, or motion of the vehicle 104. Similar to the transmit signals 302, the return signals 304 are composed of one or more chirps. This document further describes the characteristics of the transmit signals 302 and the return signals 304 with respect to FIG. 3-2.

FIG. 3-2 illustrates a frequency-time plot 310 of the transmit signal 302 and the return signal 304 for the pixels 306-11 and 306-21 of the lidar system 102 of FIG. 3-1. FIG. 3-2 also illustrates an amplitude-time plot 312 of the return signal 304 for the pixels 306-11 and 306-21. In the frequency-time plot 310, the vertical axis represents frequency and the horizontal axis represents time. In the amplitude-time plot 312, the vertical axis represents amplitude and the horizontal axis represents time. The frequency-time plot 310 and the amplitude-time plot 312 illustrate the transmit signal 302 and the return signal 304 for a single frame 308-1.

The frequency-time plot 310 illustrates the frequency of the transmit signals 302 and the return signals 304 as a function of time for the frame 308-1. The frequency of the transmit signals 302-11 and 302-11 is linearly increasing over time. In other words, transmit signal 302-21 has the same frequency slope as the transmit signal 302-11. The center frequency of the transmit signal 302-21, however, is greater than the center frequency of the transmit signal 302-11. The return signals 304-11 and 304-21 have the same frequency slope as the transmit signals 302-11 and 302-21.

The amplitude-time plot 312 illustrates the amplitude of the return signals 304-11 and 304-21 as a function of time for the frame 308-1. The return signals 304-11 and 304-21 reflect the amplitude modulations of the transmit signals 302-11 and 302-21, respectively, for the frame 308-1. In the depicted example, the frequency of the amplitude modulation of the return signal 304-11 (represented by a solid line in FIG. 3-2) is lower than the frequency of the amplitude modulation of the return signal 304-21 (represented by a dashed line in FIG. 3-2).

The frequency-time plot 310 depicts multiple pixels 306 and multiple detection windows Ti. In general, each detection window Ti is associated with a particular pixel 306. For example, the detection windows $T_{i11}$ and $T_{i21}$ are associated with the pixels 306-11 and 306-21, respectively. In the depicted example, the detection window $T_{i11}$ occurs during a time that a portion of the transmit signal 302-11 is transmitted and a portion of the transmit signal 302-12 is transmitted. The duration for each detection window $T_i$ is sufficient to enable the lidar system 102 to receive reflections for a particular detection range. During each detection window $T_i$, the transceiver 212 collects samples of the return signal 304. As described above with respect to FIG. 3-1, the return signals 304 represent reflections of the transmit signal 302 for the associated pixel 306 or reflections of the transmit signal 302 associated with a neighboring pixel 306.

During the frame 308-1, the lidar system 102 receives the return signal 304-11 during a detection window $T_{i11}$, obtaining characteristics (e.g., range information, range-rate information, angular information) of the object 108-1 for the pixel 306-11. The lidar system 102 subsequently receives the return signal 304-21, obtaining characteristics of the object 108-2 for the pixel 306-21. For example, the lidar system 102 can determine angular information of the object 108 (e.g., the object 108-2) based on the angle associated with the corresponding pixel 306 (e.g., the pixel 306-2). As discussed in more detail with respect to FIGS. 4, 5-1, and 5-2, the lidar system 102 determines a beat frequency ($f_b$) for the return signals 304. The lidar system 102 can use the beat frequency to obtain range and range-rate information for the objects 108, as presented in the following equations. In these equations, R is range (e.g., distance) to the object 108, v is range rate (e.g., radial velocity) of the object 108, c is the speed of light, $f_c$ is the frequency of the transmit signal 302 (e.g., the carrier frequency), T is the period of the pixel 306, and B is the bandwidth of the pixel 306. Accordingly:

$$\text{the Doppler frequency is: } f_D = 2 * v * \frac{f_c}{c} \quad \text{Eq. 1}$$

$$\text{the beat frequency is: } f_b = 2 * \frac{R * B}{c * T} - f_D \quad \text{Eq. 2}$$

For each of the pixels 306 of the frame 308-1, the lidar system 102 processes the return signal 304 to determine the beat frequency. For example, the return signal 304-11 is received during the detection window $T_{i11}$. The process repeats for each of the pixels 306 in the field-of-view 106 for the frame 308-1 and then repeats for all the pixels 306 in subsequent frames. In this example, the return signal 304-11 is received during the detection window Tim, which corresponds to the pixel 306-11, and the beginning portion of the detection window $T_{i21}$, which corresponds to the pixel 306-21. During the latter portion of the detection window $T_{i11}$ and the beginning portion of the detection window $T_{i21}$, the lidar system 102 receives both the return signal 304-11 and the return signal 304-21 (represented by a dashed line in FIG. 312). The return signals 304-11 and 304-21 can overlap because the object 108-1, which reflected the return signal 304-11, is farther away from the lidar system 102 than the object 108-2, which reflected the return signal 304-21.

In such situations where multiple return signals 304 for different pixels 306 are received at the same time, the linearly-increasing frequency (e.g., uniform frequency slope) of the transmit signal 302 (as shown in FIG. 3-2) allows the beat frequency of the return signals 304 to be correctly determined via the mixing operation in the receiver 404, which is discussed with respect to FIGS. 4, 5-1, and 5-2.

The detection window $T_i$ may include return signals 304 from a single pixel (e.g., the pixel 306-11) or consecutive pixels (e.g., the pixels 306-11 and 306-21). In other words, a single detection window $T_i$ can span a portion of time in which a current transmit signal 302 is transmitted and a portion of time in which a subsequent transmit signal 302 is transmitted. In other implementations, the detection windows $T_i$ can be lengthened to listen for return signals 304 for larger groups of consecutive pixels. For example, the detection window $T_{i11}$ can be lengthened to listen for return signals 304 for the pixels 306-11 to 306-31 (not shown). In other words, the single detection window $T_i$ can span a portion of time that the current transmit signal 302 is transmitted and a portion of time that two or more subsequent transmit signals 302 are transmitted.

In some cases, the lidar system 102 dynamically varies the waveform of the transmit signal 302 for the same pixel 306 across consecutive frames. As described in more detail with respect to FIGS. 5-1 and 5-2, the first waveform can be reused for the transmit signal 302 of another pixel 306 within a subsequent frame of consecutive frames, but the waveforms used for the transmit signals of the same pixel of consecutive frames are different. As such, the transmit signal 302-11 (the second transmit signal) has a second waveform for the pixel 306-11 and the transmit signal 302-21 (the fourth transmit signal) has a fourth waveform for the pixel 306-21 in the subsequent frame of consecutive frames. The second waveform has a different modulation than the first waveform for the same pixel 306-11 of the initial frame of consecutive frames. Similarly, the fourth waveform has a different modulation than the third waveform for the same pixel 306-21 of the initial frame. The lidar system 102 can apply different types of modulations by, for example, varying the phase modulation, frequency modulation, amplitude modulation, or any combination thereof. The lidar system 102 can vary the waveform to improve the signal-to-noise ratio of the return signal 304 or improve its confidence in resolving multiple return signals to their corresponding pixels, as further described with respect to FIGS. 4, 5-1, and 5-2.

Figure 4:
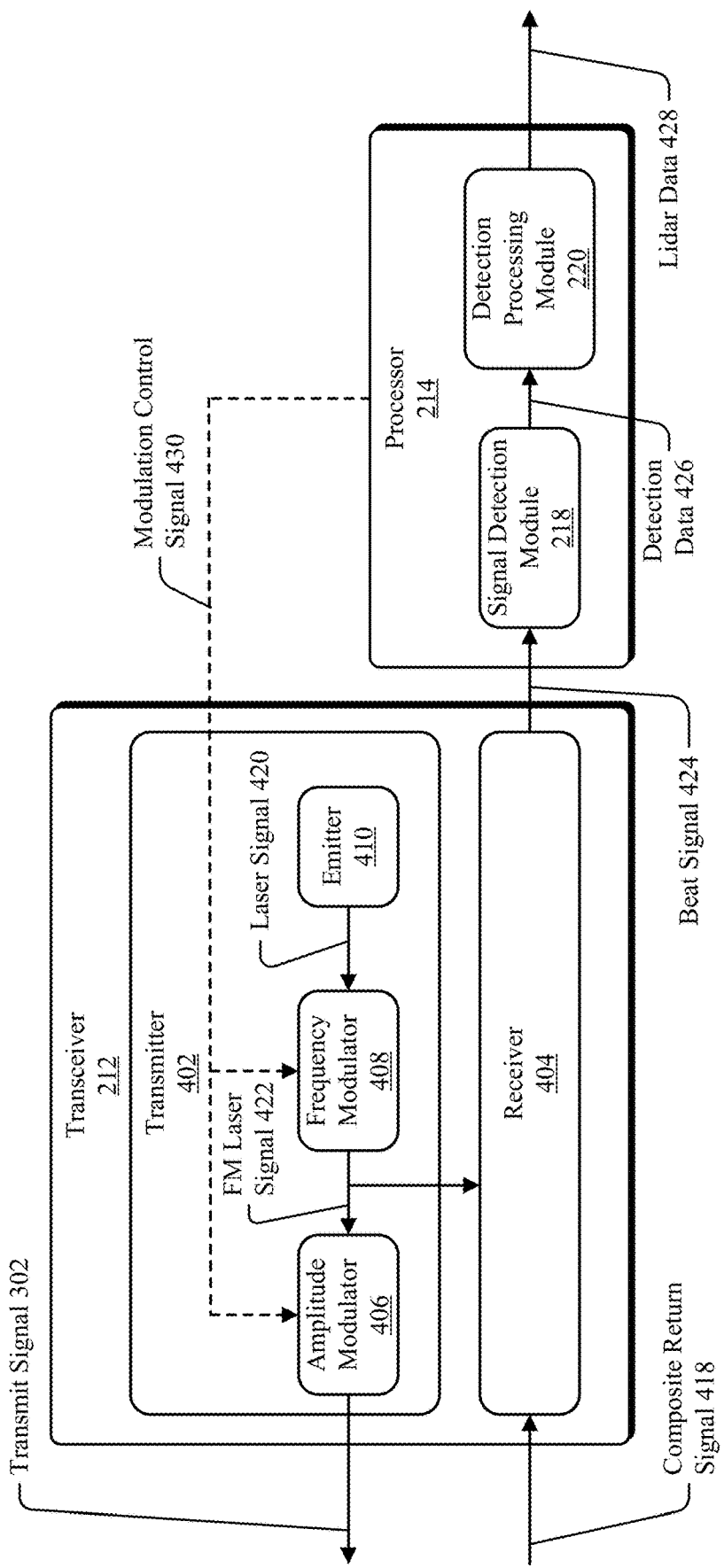
FIG. 4 illustrates an example transceiver and processor of the described FMCW lidar system.

FIG. 4 illustrates an example transceiver 212 and an example processor 214 of the described lidar system 102. In the depicted configuration, the transceiver 212 is coupled between the beam-steering components 210 (of FIG. 2) and the processor 214. The processor 214 implements the signal detection module 218 and the detection processing module 220. The processor 214 is connected to a data path of the return signal 304.

The transceiver 212 includes at least one transmitter 402 and at least one receiver 404. The transmitter 402 generates the transmit signal 302 and passes the transmit signal 302 to the beam-steering components 210. The transmitter 402 includes at least one amplitude modulator 406, at least one frequency modulator 408, and at least one emitter 410. The emitter 410 includes a laser or similar component, which generates an optical signal. The emitter 410 is coupled to the frequency modulator 408.

The frequency modulator 408 performs frequency modulation to enable the lidar system 102 to operate as an FMCW lidar system. In some cases, the frequency modulator 408 varies the frequency modulation for transmit signals 302 that are associated with consecutive pixels 306 or the same pixel 306 of consecutive frames 308. Consider the example transmit signals 302-11 and 302-21 in FIG. 3-2. In this case, the frequency modulator 408 causes the frequency across the set of transmit signals 302-11 and 302-21 to linearly increase over time for the frame 308-1. In other words, the frequency modulator 408 causes the transmit signal 302-21 to have a higher center frequency than a center frequency of the transmit signal 302-11. The frequency modulator 408 also causes the frequencies of the individual transmit signals 302-11 and 302-21 to increase at the same rate (e.g., the same frequency slope). If the transmit signal 302 includes multiple chirps, the frequency modulator 408 can also vary the frequency modulation for different chirps that are associated with the same pixel 306. In addition, the frequency modulator 408 can cause the frequency across the transmit signal 302-11 for the frame 308-2 (not shown in FIG. 3-2) to be different than the frequency across the transmit signal 302-11 for the frame 308-1.

The amplitude modulator 406 is coupled to the frequency modulator 408 and applies a unique amplitude modulation scheme. The amplitude modulator 406 can also be used to enable detections to be resolved for different return signals 304 among the pixels 306. The amplitude modulator 406 can vary the amplitude modulation for transmit signals 302 that are associated with different pixels 306 or the same pixel 306 across consecutive frames 308. If the transmit signal 302 includes multiple chirps, the amplitude modulator 406 can also vary the amplitude modulation for different chirps that are associated with the same pixel 306.

In other implementations, the amplitude modulator 406 can be implemented as another type of modulator 406 that provides amplitude modulation, frequency modulation, phase modulation, or any combination thereof to generate unique waveforms for the same pixel 306 of consecutive frames 308. In additional implementations, the amplitude modulator 406 is not present and only the frequency modulator 408 is used to generate unique waveforms for the same pixel 306 of consecutive frames 308.

The receiver 404 receives and conditions a composite return signal 418 for the processor 214. The composite return signal 418 includes at least one of the return signals 304 of FIGS. 3-1 and 3-2. Although not explicitly shown, the receiver 404 can include a photodetector and other receiver elements, such as an amplifier, a mixer, a filter, and an analog-to-digital converter. The mixer and analog-to-digital converter of the receiver 404 and their operation in the described FMCW lidar system are further described with respect to FIGS. 5-1 and 5-2.

During operation, the emitter 410 generates a laser signal 420, which can have a steady (e.g., constant) frequency. The frequency modulator 408 modulates the frequency of the laser signal 420 to generate a frequency-modulated (FM) laser signal 422. The amplitude modulator 406 modulates the amplitude of the frequency-modulated laser signal 422 to generate the transmit signal 302, which has a particular frequency modulation and amplitude modulation that is associated with its corresponding pixel 306 for an initial frame 308.

The transmit signal 302 propagates through space and is reflected by the object 108 (e.g., one of the objects 108-1 and 108-2 depicted in FIG. 3-1). The receiver 404 receives the reflected version of the transmit signal 302, which is represented by the composite return signal 418. The receiver 404 mixes the composite return signal 418 with the FM laser signal 422 to downconvert and demodulate the frequency of the composite return signal 418. The receiver 404 generates a beat signal 424, which is a time-domain digital signal.

The processor 214 accepts the beat signal 424 and analyzes the beat signal 424 to generate lidar data 428. In particular, the processor 214 executes the signal detection module 218 and the detection processing module 220. The signal detection module 218 performs one or more operations to associate the return signal 304 to its corresponding pixel 306 among the frames 308. The signal detection module 218 also compares the determined beat frequency of the return signal 304 for a subsequent frame 308 (e.g., the frame 308-2) with the determined beat frequency of the return signal 304 for an initial frame 308 (e.g., the frame 308-1) of consecutive frames 308. The signal detection module 218 passes detection data 426 to the detection processing module 220. The detection data 426 can include each of the beat signals 424 and an indication of its corresponding pixel 306. The detection processing module 220 analyzes the detection data 426 and generates the lidar data 428. The lidar data 428 can include range, range rate, and/or angular information of the object 108 that reflected the return signal 304. In other cases, the lidar data 428 indicates whether an object 108 is in a blind spot of the vehicle 104. The processor 214 provides the lidar data 428 to the vehicle-based systems 202 (of FIG. 2).

In some situations, the processor 214 outputs a modulation control signal 430 to the amplitude modulator 406 or the frequency modulator 408. The processor 214 directs the amplitude modulator 406 or the frequency modulator 408 to apply a particular modulation to the transmit signal 302 of a subsequent frame 308. The modulation control signal 430 can direct the modulation of the transmit signal 302 be varied for each pixel 306 of the subsequent frame 308 or for a subset of the pixels 306 of the subsequent frame 308. The modulation control signal 430 can be output by different components, including, for example, the signal matching module 218, the detection processing module 220, or the receiver 404. In addition, the modulation applied by the amplitude modulator 406 and the frequency modulator 408 can be programmed to cycle through different modulations for subsequent frames 308 without receiving the modulation control signal 430. By changing the amplitude modulation applied by the amplitude modulator 406, the frequency modulation applied by the frequency modulator 408, or a combination thereof in a subsequent frame 308 (e.g., the frame 308-2 (not shown)), the lidar system 102 can improve the signal-to-noise ratios of return signals 304 across consecutive frames 308 or improve its confidence in resolving return signals 304 among pixels 306, as further described with respect to FIGS. 5-1 and 5-2.

Figures 1, 5:
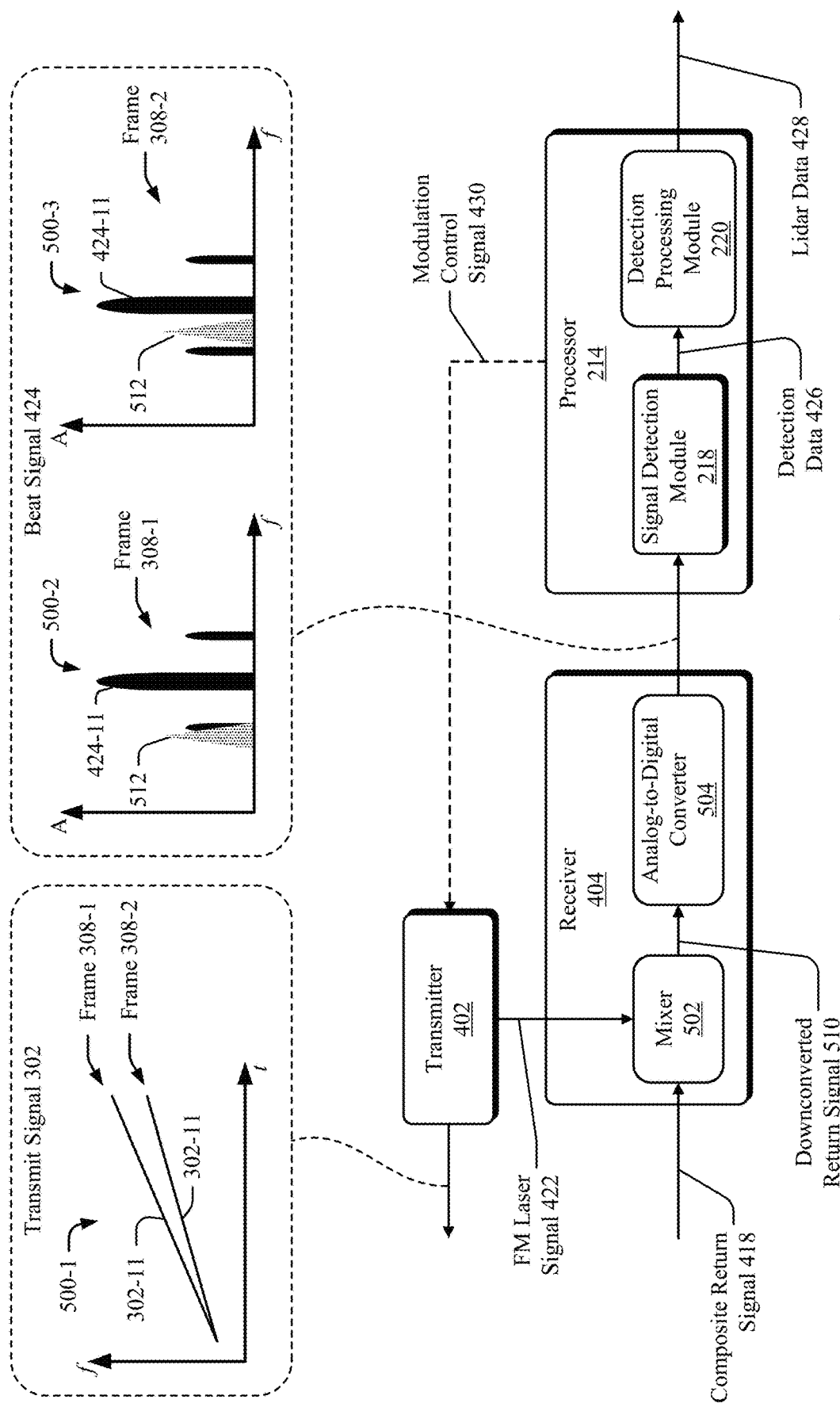
Figures 2, 5:
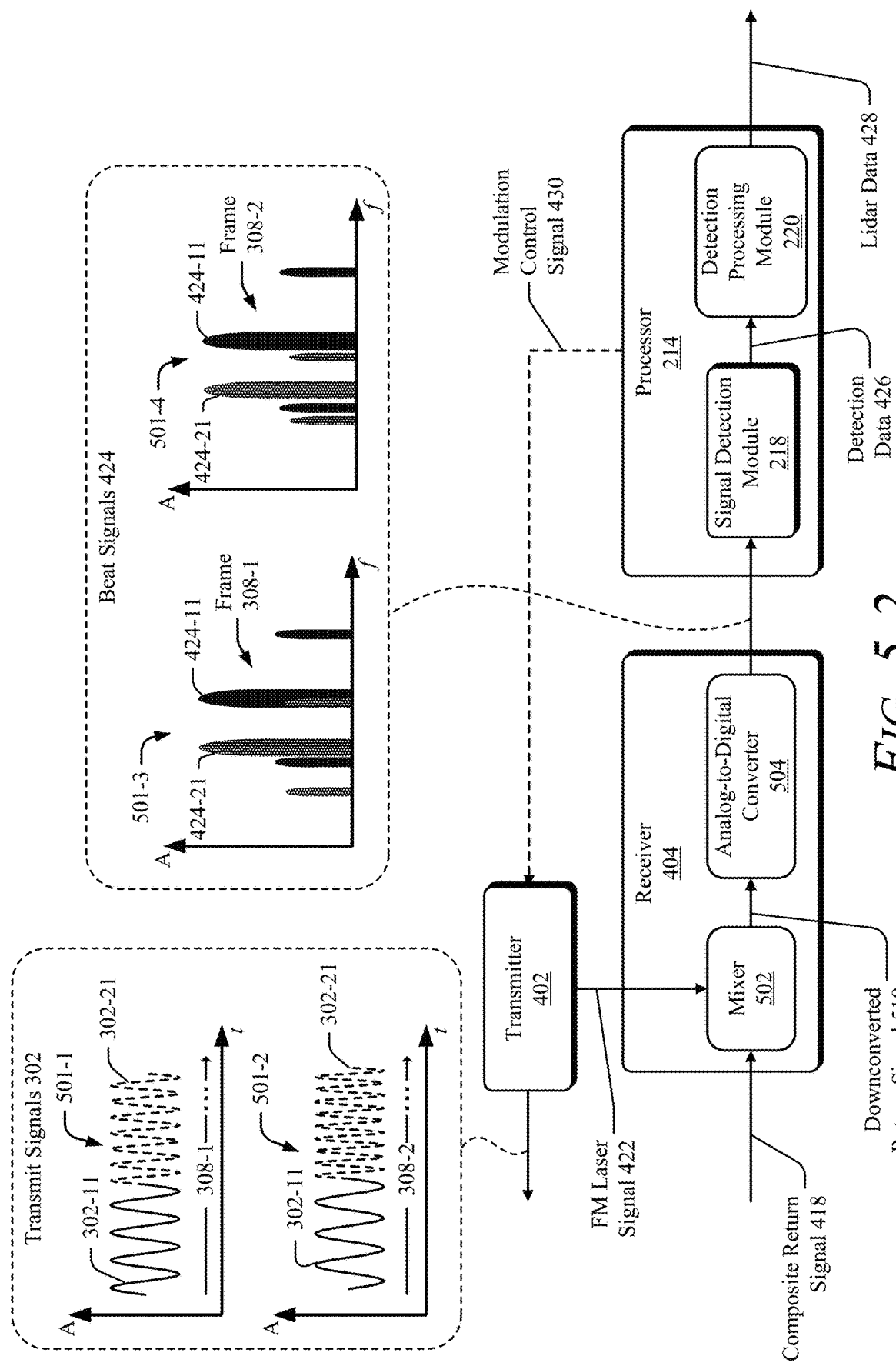

FIG. 5-1 illustrates example operations of the transmitter 402, the receiver 404, and the processor 214, which includes the signal detection module 218 and the detection processing module 220, of the described lidar system 102.

The receiver 404 includes a mixer 502 and an analog-to-digital converter 504. The mixer 502 mixes the composite return signal 418 with the FM laser signal 422 to downconvert and demodulate the frequency of the composite return signal 418. The analog-to-digital converter converts the downconverted output of the mixer 502, which is an analog signal, into a time-domain digital signal.

During operation, the transmitter 402 transmits the transmit signal 302-11 (the first transmit signal) in the pixel 306-11 for the initial frame 308-1. In FIG. 5-1, the transmit signal 302-11 is illustrated in a graph 500-1, which includes a horizontal axis representing time and a vertical axis representing frequency. The transmit signal 302-11 has a first waveform, which includes a first frequency modulation and a first amplitude modulation. The first frequency modulation of the transmit signal 302-11 is linearly increasing, as illustrated in the graph 500-1. The first amplitude modulation of the transmit signal 302-11 is not shown in the graph 500-1, but is indirectly illustrated in graphs 500-2 and 500-3. The graphs 500-2 and 500-3 include a horizontal axis representing frequency and a vertical axis representing amplitude. In the graphs 500-2 and 500-3, the first amplitude modulation of the transmit signal 302-11 is shown by the frequency offset between the center peak and the sideband peaks in the beat signal 424-11. As discussed below, the beat signal 424-11 is a processed version of the return signal 304-11, which is a reflected version of the transmit signal 302-11.

The transmit signal 302-11 propagates through space and is reflected by the object 108-1, as depicted in FIG. 3-1. The receiver 404 receives the reflected version of the transmit signal 302, which is represented by the composite return signal 418. The composite return signal 418 includes the return signal 304-11 (the first return signal), which is the reflected version of the transmit signal 302-11, and a noise peak 512. The noise spikes can arise from external and internal sources. External noise sources can include sunlight, light from other sources, and stray laser signals from other lidar systems. Internal noise sources can include noise of the receiver 404 or a photodetector and thermal noise of components with the lidar system 102. The mixer 502 mixes the composite return signal 418 with the FM laser signal 422 to downconvert and demodulate the frequency of the composite return signal 418. The mixer outputs a downconverted return signal 510 to the analog-to-digital converter 504. The analog-to-digital converter 504 converts the downconverted return signal 510 to the beat signal 424, which is a time-domain digital signal.

The beat signal 424 is illustrated in FIG. 5-1 in the graphs 500-2 and 500-3. The beat signal 424 includes the beat signal 424-11, which corresponds to the return signal 304-11, and the noise peak 512, which is represented by the white-speckled shape in the graphs 500-2 and 500-3. The beat signal 424-11 has a center peak and sideband peaks, which are represented as black shapes in FIG. 5-1, as depicted in the graph 500-2. The center peak of the beat signal 424-11 represents the beat frequency of the return signal 304-11 for the initial frame 308-1. As described with respect to FIG. 3-2, the lidar system 102 can compute range or range rate associated with the object 108-1 based on the beat frequency of the return signal 304-11. In this example, the center peak of the beat signal 424-11 has a higher frequency than the noise spike 512, as depicted in the graph 500-2, but the frequency of one of the sideband peaks of the beat signal 424-11 is approximately the same as the frequency of the noise spike 512. The combination of the sideband peak of the beat signal 424-11 and the noise spike 512 at approximately the same frequency can result in two large peaks (e.g., the center peak and the combination of the sideband peak and the noise spike) in the beat signal 424-11. The two large peaks can reduce the confidence of the lidar system 102 in determining in which pixel 306 the object 108-1 is located or in determining the beat frequency associated with the object 108-1. In this way, the noise spike 512 can decrease the accuracy of the lidar system 102 in identifying the location of objects 108 or determining a characteristic of the object 108-1.

The beat signal 424 is output to the signal detection module 218. The signal detection module 218 processes the beat signal 424 to associate the beat signal 424-11, which corresponds to the return signal 304-11, to the corresponding pixel 306-11. For example, the signal detection module 218 can compare the sideband offsets between the center peak and the sideband peaks in the beat signal 424-11 to the sideband offsets associated with the amplitude modulation of the transmit signal 302-11. As another example, the signal detection module 218 can compare the beat signal 424 in the frequency domain to a first template signal and a second template signal to generate a first comparison result and a second comparison result, respectively. The signal detection module 218 can utilize a cross-correlation, convolution, or match-filtering process to perform the comparison. The first template signal has the same amplitude modulation as the transmit signal 302-11. The second template signal has the same amplitude modulation as the transmit signal 302 (e.g., the transmit signal 302-21) for a neighboring pixel 306. Based on identifying the first comparison result among the two comparison results as the comparison result with the largest amplitude peak, the signal detection module 218 can associate the return signal 304-11 to the pixel 306-11. As described above with respect to FIG. 4, the signal detection module 218 passes detection data 426 to the detection processing module 220, which analyzes the detection data 426 and outputs lidar data 428.

In this example and as described above, the lidar system 102 can have decreased confidence in identifying the object 108-1 and determining a characteristic of the object 108-1. To address this problem in a subsequent frame 308-2, the processor 214 selects a different waveform to be used for the same pixel 306-11 in the subsequent frame 308-2. This new waveform can have a particular frequency modulation to shift the center peak and the sideband peaks of the beat signal 424 or a particular amplitude modulation to shift the sideband peaks of the beat signal 424. Using either technique, the modified waveform for the subsequent frame effectively shifts the lower sideband peak of the beat signal 424 away from the noise spike 512.

The processor 214 outputs the modulation control signal 430 to the frequency modulator 408 (of FIG. 4) to increase the confidence of the lidar system 102 for the subsequent frame 308-2. In the depicted example, the processor 214, via the modulation control signal 430, directs the frequency modulator 408 to decrease the frequency slope of the transmit signal 302-11 (the second transmit signal) for the frame 308-2, as illustrated in the graph 500-1. The transmit signal 302-11 for the frame 308-2 has a second waveform, which has a different frequency modulation than the first waveform. In particular, the second waveform includes a second frequency modulation, which has a smaller frequency slope than the first frequency modulation, and a second amplitude modulation, which is the same as the first amplitude modulation. Using this technique, the lidar system 102 can dynamically adjust the waveforms used in subsequent frames (e.g., the frame 308-2) to reduce the probability of the noise signal 512 overlapping with the beat signal 424. Furthermore, this dynamic capability enables the lidar system 102 to perform real-time adjustments in response to detecting changes in the environment, such as changes to the frequency of the noise signal 512 or the detection of other noise signals.

In other implementations, the frequency modulator 408 is programmed to cycle through different frequency modulations for subsequent frames 308. As a result, the frequency modulation of the transmit signal 302-11 of the pixel 306-1 for the frame 308-2 is different than the frequency modulation of the transmit signal 302-11 of the same pixel 306-1 for the frame 308-1. As another example, the frequency modulator 408 is programmed to cycle through multiple sets of frequency modulations for subsequent frames 308. As a result, the frequency modulation of the transmit signal 302-11 for the frames 308-1, 308-2, 308-3 (not shown), and 308-4 (not shown) can be a first frequency modulation, a second frequency modulation, a third frequency modulation, and the first frequency modulation, respectively.

In the frame 308-2, the transmitter 402 transmits the transmit signal 302-11 and the receiver 404 receives the return signal 304-11 (the second return signal) as part of the composite return signal 418. In some situations, the transmitter 402 can adjust the duration of the second waveform to compensate for any adjustment to the frequency slope in order to maintain the same range resolution across multiple frames. For a linearly-increasing frequency modulation, the range resolution of the lidar system 102 is proportional to the ratio of the frequency slope to the waveform duration (e.g., chirp duration). In the case of frame 308-2, the lidar system 102 increases the waveform duration (e.g., the duration of the transmit signal 302) to compensate for the decrease in the frequency slope in order to maintain the same range resolution as the previous frame 308-1.

The mixer 502 mixes the composite return signal 418 with the FM laser signal 422 of the frame 308-2. The mixer outputs the downconverted return signal 510, which is converted into the beat signal 424 by the analog-to-digital converter 504.

The beat signal 424 is output to the signal detection module 218. The beat signal 424 includes the beat signal 424-11, which corresponds to the return signal 304-11, and the noise peak 512 as depicted in the graph 500-3. In the frame 308-2, the frequencies of the center peak and sideband peaks of the beat signal 424-11 are shifted (left) to a lower frequency. The frequency shift occurs because the center frequency of the second frequency modulation is lower than the center frequency of the first frequency modulation. The beat frequency of the beat signal 424-11 still has a higher frequency than the noise spike 512, but the frequency of the lower sideband peak is shifted below the noise spike 512. In this way, the frequency of the noise spike 512 is different than the beat frequency and the frequencies of the sideband peaks of the beat signal 424-11.

The signal detection module 218 processes the beat signal 424 and associates the beat signal 424-11, which corresponds to the return signal 304-11, to the corresponding pixel 306-11. Because the sideband peaks of the beat signal 424-11 have been shifted away from the noise spike 512 in the frame 308-2, the confidence of the lidar system 102 in associating the object 108-1 to the center peak of the beat signal 424-11 and determining a characteristic of the object 108-1 can be increased.

The signal detection module 218 also compares the beat frequency of the return signal 304-11 determined in the frame 308-2 with the beat frequency of the return signal 304-11 determined in the frame 308-1. In other implementations, the comparison can be performed by the detection processing module 220 or another component executed by the processor 214. The signal detection module 218 can perform the comparison by, for example, confirming that the signal-to-noise ratio of the beat signal 424-11 of the frame 308-2 is greater than the signal-to-noise ratio of the beat signal 424-11 of the frame 308-1. The comparison can inform the lidar system 102 whether the waveform adjustment in the subsequent frame 308-2 sufficiently improved its confidence in identifying the object 108-1 and determining a characteristic of the object 108-1 or whether additional adjustment is necessary for a later frame (e.g., the frame 308-3). The signal processing module 220 can perform the comparison by, for example, confirming a characteristic of the object 108-1 determined in the frame 308-2 is approximately the same as the characteristic of the object 108-1 determined in the frame 308-1. The comparison allows the lidar system 102 to increase the confidence of the lidar data 428 provided to the vehicle-based systems 202.

In other implementations, the lidar system 102 adjusts the amplitude modulation of the transmit signal 302-11 for the subsequent frame 308-2. The adjusted amplitude modulation causes the frequency of the sideband peaks of the beat signal 424-11 to shift toward or away from the center peak of the beat signal 424-11. In this way, the lidar system 102 can avoid the overlap of the noise spike 512 with the center peak or a sideband peak of the beat signal 424-11 in the subsequent frame 308-2. In still other implementations, the lidar system 102 can adjust both the amplitude modulation and the frequency modulation of the transmit signal 302-11 for the subsequent frame 308-2.

The signal detection module 218 passes detection data 426 to the detection processing module 220, which analyzes the detection data 426 and determines a characteristic of the object 108-1 that reflected the return signal 304-11. By varying the waveform for a same pixel in a subsequent frame, the lidar system 102 can prevent a beat signal 424 from overlapping with a noise signal 512 in the frequency domain and increase the confidence of the lidar data 428 provided to the vehicle-based systems 202. A similar set of operations can be performed by the lidar system 102 to increase the signal-to-noise ratio of the return signals 304 across the frames 308, when multiple return signals 304 are received within a single detection window, as further described with respect to FIG. 5-2.

FIG. 5-2 illustrates another set of example operations of the transmitter 402, the receiver 404, and the processor 214 of the described lidar system. In the depicted example, the lidar system 102 receives multiple return signals 304 during a single detection window $T_i$. As described above with respect to FIG. 3-2, the lidar system 102 can receive multiple return signals 304 during a single detection window because the objects 108 that reflected the return signals 304 are at different distances from the lidar system 102 and the lidar system 102 has a reduced delay between the transmit signals 302. The lidar system 102 changes the waveform of the transmit signal 302 of the same pixels 306 for the consecutive frames 308 to improve the accuracy of associating the return signals 304 across the consecutive pixels 306 for the consecutive frames 308.

During operation, the transmitter 402 transmits the transmit signals 302-11 (the first transmit signal) and 302-21 (the third transmit signal) in the pixels 306-11 and 306-21, respectively, for the initial frame 308-1. In FIG. 5-2, the transmit signals 302-11 and 302-21 for the initial frame 308-1 are illustrated in a graph 501-1, which includes a horizontal axis representing time and a vertical axis representing amplitude. In the graph 501-1, the transmit signal 302-11 is represented by a solid line and the transmit signal 302-21 is represented by a dashed line.

The transmit signal 302-11 has a first waveform, which includes a first frequency modulation and a first amplitude modulation. The transmit signal 302-21 has a third waveform, which includes a third frequency modulation and a third amplitude modulation. The third waveform is different than the first waveform, which allows the lidar system 102 to resolve return signals 304 among the pixels 306-11 and 306-21. In the depicted implementation, the third frequency modulation is different than the first frequency modulation, as depicted in FIG. 3-2. The third frequency modulation and the first frequency modulation linearly increase at the same rate (e.g., the frequency slope is the same), but the center frequency of the transmit signal 302-21 is higher than the center frequency of the transmit signal 302-11. The third amplitude modulation is different than the first amplitude modulation. As depicted in the graph 501-1, the amplitude of the transmit signal 302-11 changes at a slower rate compared to the amplitude of the transmit signal 302-21, which is illustrated by the transmit signal 302-21 having more cycles for the pixel 306-21 than the transmit signal 302-11 does for the pixel 306-11.

The transmit signals 302-11 and 302-21 propagate through space and are reflected by the objects 108-1 and 108-2, as depicted in FIG. 3-1. The receiver 404 receives the reflected version of the transmit signals 302, which is represented by the composite return signal 418. The composite return signal 418 includes the return signals 304-11 (the first return signal) and 304-21 (the third return signal), which are the reflected versions of the transmit signal 302-11 and 302-21, respectively. The mixer 502 mixes the composite return signal 418 with the FM laser signal 422 to downconvert and demodulate the frequency of the composite return signal 418. The mixer outputs a downconverted return signal 510 to the analog-to-digital converter 504. The analog-to-digital converter 504 converts the downconverted return signal 510 to the beat signal 424.

The beat signal 424 is illustrated in a graph 501-3, which includes a horizontal axis representing frequency and a vertical axis representing amplitude. The beat signal 424 includes the beat signals 424-11 and 424-21, which correspond to the return signals 304-11 and 304-21, respectively. The beat signal 424-11 has a center peak and sideband peaks, which are represented as black shapes in the graph 501-3. The beat signal 424-21 has a center peak and sideband peaks, which are represented as white-speckled shapes. The center peaks of the beat signals 424-11 and 424-21 represent the beat frequency of the return signals 304-11 and 304-21, respectively, for the initial frame 308-1. In this example, the beat frequency of the beat signal 424-11 has a higher frequency than the beat frequency of the beat signal 424-21, but the frequency of one of the sideband peaks for the beat signals 424-21 is approximately equal to the beat frequency of the other beat signal 424-11. The overlap of the beat frequency of the beat signal 424-11 with a sideband peak of the beat signal 424-21 can lower the confidence of the lidar system 102 in associating the beat signals 424 with their corresponding pixels 306 and in determining a characteristic of the objects 108-1 and 108-2.

The beat signals 424 are output to the signal detection module 218. The signal detection module 218 processes the beat signals 424 to associate the beat signals 424-11 and 424-21 to the corresponding pixels 306-11 and 306-21, respectively. For example, the signal detection module 218 can compare the sideband offsets between the center peak and the sideband peaks in the beat signals 424 to the sideband offsets associated with the amplitude modulation of the transmit signals 302. As another example, the signal detection module 218 can compare the beat signal 424 in the frequency domain to a first template signal and a second template signal to generate a first comparison result and a second comparison result, respectively. The first template signal has the same amplitude modulation as the transmit signal 302-11. The second template signal has the same amplitude modulation as the transmit signal 302-21. Based on identifying the first comparison result among the two comparison results as the comparison result with the largest-amplitude peak, the signal detection module 218 can associate the return signal 304-11 to the pixel 306-11. Similarly, the signal detection module 218 can associate the return signal 304-21 to the pixel 306-21. As described above with respect to FIG. 4, the signal detection module 218 passes detection data 426 to the detection processing module 220, which analyzes the detection data 426 and outputs lidar data 428.

To address the decreased confidence in associating the return signals 304-11 and 304-21 to their corresponding pixels 306-11 and 306-21, respectively, the waveforms of the transmit signals 302-11 and 302-21 can be changed for the subsequent frame 308-2. The new waveforms can have a particular modulation to shift the upper sideband peak of a subsequent beat signal 424-21 away from the center peak of a subsequent beat signal 424-11.

In this example, the processor 214 outputs the modulation control signal 430 to the amplitude modulator 406 (of FIG. 4) to decrease the rate of amplitude modulation of the transmit signal 302-11 and increase the rate of amplitude modulation of the transmit signal 302-21 in the next frame 308-2. As depicted in a graph 501-2, the transmit signal 302-11 for the frame 308-2 has a second waveform, which has a different modulation than the first waveform. The second waveform includes a second frequency modulation, which is the same as the first frequency modulation, and a second amplitude modulation, which is different than the first amplitude modulation. The second waveform can have the same or a different modulation than the third waveform of the transmit signal 302-21 for the frame 308-1. As depicted in the graph 501-2, the transmit signal 302-21 for the frame 308-2 has a fourth waveform, which has a different modulation than the third waveform and the second waveform. The fourth waveform includes a fourth frequency modulation, which is the same as the third frequency modulation, and a fourth amplitude modulation, which is different than the third amplitude modulation and the second amplitude modulation. The fourth waveform can have the same or a different modulation than the first waveform.

Alternatively, the fourth amplitude modulation of the fourth waveform is the same as the third amplitude modulation and different than the second amplitude modulation. In this alternative implementation, the waveforms of the transmit signals 302-11 and 302-21 are different than one another for each of the frames 308-1 and 308-2, but only the waveform of the transmit signal 302-11 is changed in the frame 308-2 compared to its waveform in the frame 308-1.

In the depicted example of FIG. 5-2, the frequency slope of the first waveform (associated with the transmit signal 302-11 of the frame 308-1) is the same as the second waveform (associated with the transmit signal 302-11 of the frame 308-2), the third waveform (associated with the transmit signal 302-21 of the frame 308-1), and the fourth waveform (associated with the transmit signal 302-21 of the frame 308-2). In other implementations, the modulation control signal 430 causes both the frequency modulation and the amplitude modulation of the transmit signals 302 in the subsequent frame 308-2 to be varied. For example, the frequency slope of the second waveform and the fourth waveform is different than the frequency slope of the first waveform and the third waveform.

In other implementations, the amplitude modulator 406 is programmed to cycle through different amplitude modulations for subsequent frames 308. As a result, the amplitude modulations of the transmit signals 302-11 and 302-21 for the frame 308-2 are different than the amplitude modulations of the transmit signals 302-11 and 302-21 for the frame 308-1. As another example, the amplitude modulator 406 is programmed to cycle through multiple sets of amplitude modulations for subsequent frames 308. As an example, the amplitude modulation of the transmit signal 302-11 for the frames 308-1, 308-2, 308-3 (not shown), and 308-4 (not shown) can be a first amplitude modulation, a second amplitude modulation, a third amplitude modulation, and the first amplitude modulation, respectively.

In the frame 308-2, the transmitter 402 transmits the transmit signals 302-11 (the second transmit signal) and 302-21 (the fourth transmit signal) and the receiver 404 receives the return signals 304-11 (the second return signal) and 304-21 (the fourth return signal) as part of the composite return signal 418. The mixer 502 mixes the composite return signal 418 with the FM laser signal 422 of the frame 308-2. The mixer outputs the downconverted return signal 510, which is converted into the beat signal 424 by the analog-to-digital converter 504.

The beat signal 424 is output to the signal detection module 218. The beat signal 424 includes the beat signals 424-11 and 424-21, as depicted in a graph 501-4. In the frame 308-2, the frequencies of the sideband peaks of the beat signal 424-11 are shifted toward the frequency of the center peak when compared to the frame 308-1. This frequency shift results from the amplitude of the transmit signal 302-11 changing at a lower rate in the frame 308-2 compared to the frame 308-1. The frequencies of the sideband peaks of the beat signal 424-21 are shifted away from the frequency of the center peak, which results from the amplitude of the transmit signal 302-21 (e.g., the second amplitude modulation) changing at a faster rate in the frame 308-2 compared to the frame 308-1 (e.g., compared to the first amplitude modulation). For both of the beat signals 424-11 and 424-21, the frequencies of the center peaks are not shifted in the frame 308-2 from the frame 308-1 because the frequency modulation was unchanged from the frame 308-1 to the frame 308-2 for both the transmit signals 302-11 and 302-21. In other words, the second frequency modulation and the fourth frequency modulation are the same as the first frequency modulation and the third frequency modulation, respectively. The shift in the frequencies of the sideband peaks of the beat signals 424 results in the center peak of each of the beat signals 424 having different frequencies relative to a sideband peak of the other beat signal 424.

The signal detection module 218 processes the beat signals 424 and associates the beat signals 424-11 and 424-21 to their corresponding pixels 306-11 and 306-21, respectively. Because the sideband peaks of the beat signals 424 have been shifted away from the center peaks of the other beat signal 424, the confidence of the lidar system 102 in associating the beat signals 424-11 and 424-21 to their corresponding pixels 306-1 and 306-2, respectively, can be increased.

The signal detection module 218 also compares the beat frequency of the return signals 304-11 and 304-21 determined in the frame 308-2 with the beat frequency of the return signals 304-11 and 304-21 determined in the frame 308-1. In this way, the lidar system 102 can provide the lidar data 428 to the vehicle-based systems 202 more confidently.

The signal detection module 218 passes detection data 426 to the detection processing module 220, which analyzes the detection data 426 and determines a characteristic of the objects 108-1 and 108-2 that reflected the return signals 304-11 and 304-21. In other implementations, a similar set of operations can be performed by the lidar system 102 to increase its confidence in associating the return signals 304 to their corresponding pixels 306 across the frames 308 by changing the frequency modulation, the amplitude modulation, the phase modulation, or any combination thereof of the same pixels 306 across consecutive frames 308. In such cases, the waveform of the transmits signals 302 for the subsequent frame (e.g., the frame 308-2) is different than the waveform of the transmit signals 302 for the initial frame (e.g., the frame 308-1). The transmitter 402 can change the waveform of the transmit signals 302 for each of the pixels 306 in the subsequent frame 308 or for a subset of the pixels 306 in the subsequent frame 308. For example, if the confidence in resolving the return signal 304 for an initial frame 308 is below a threshold value for a subset of the pixels 306, the transmitter 402 can be directed to change the waveform of the transmit signal 302 in the subsequent frame 308 for only the subset of the pixels 306.

Example Method

Figure 6:
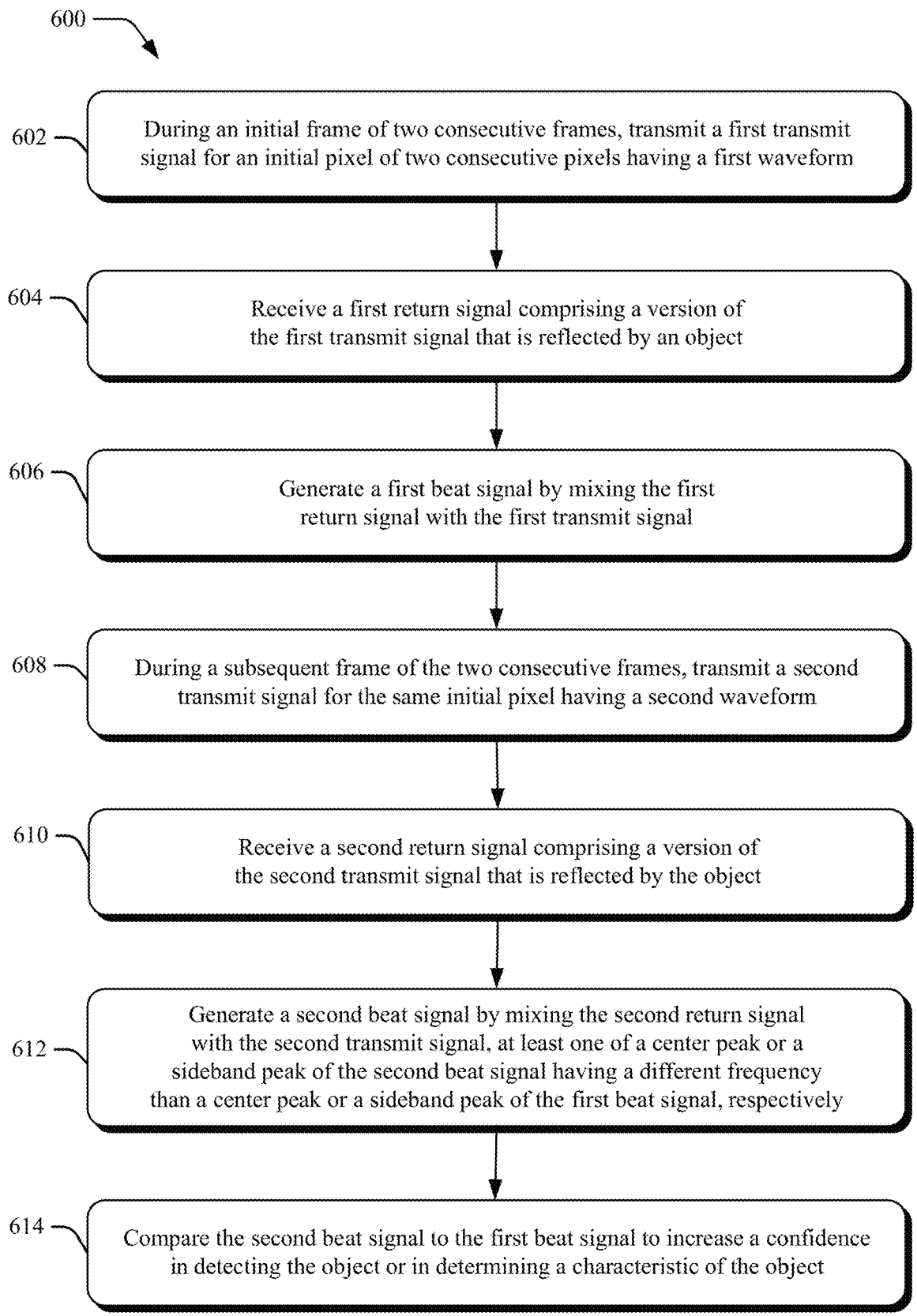
FIG. 6 illustrates an example method performed by an FMCW lidar system that varies waveforms across frames.

FIG. 6 depicts an example method 600 performed by an FMCW lidar system to vary waveforms across frames. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environments 100 and 300 of FIGS. 1 and 3-1, respectively, and entities detailed in FIGS. 1 through 5-2, reference to which is made for example only. The techniques are not limited to performance by one entity or multiple entities.

At 602, during an initial frame of two consecutive frames, a first transmit signal is transmitted for an initial pixel of two consecutive pixels. The first transmit signal has a first waveform that comprises a first frequency modulation, a first amplitude modulation, or a combination thereof. For example, during the frame 308-1 of the consecutive frames 308-1 and 308-2, the transceiver 212 of the lidar system 102 on the vehicle 104 transmits the transmit signal 302-11 for the pixel 306-11, as shown in FIG. 3-1. The transmit signal 302-11 has a first waveform that, for example, includes a first amplitude modulation and a first frequency modulation, as shown in FIG. 3-2.

At 604, a first return signal is received. The first return signal is a version of the first transmit signal reflected by an object. For example, the transceiver 212 of the lidar system 102 on the vehicle 104 receives the return signal 304-11, as shown in FIG. 3-1. The return signal 304-11 is a reflection of the transmit signal 302-11 reflected by the object 108-1.

At 606, a first beat signal is generated by mixing the first return signal with the first transmit signal. For example, the lidar system 102 mixes the return signal 304-11 with the transmit signal 302-11 in the mixer 502 to generate the beat signal 424 for the frame 308-1, as shown in FIG. 5-1. The frequency with the largest amplitude in the beat signal 424 represents the beat frequency of the return signal 304-11, as shown in the amplitude-frequency plot of FIG. 5-1.

At 608, during a subsequent frame of the two consecutive frames, a second transmit signal for the same initial pixel is transmitted. The second transmit signal has a second waveform that comprises a second frequency modulation, a second amplitude modulation, or a combination thereof. At least one of the second frequency modulation and the second amplitude modulation is different than the first frequency modulation and the first amplitude modulation, respectively. For example, during the frame 308-2 of the consecutive frames 308-1 and 308-2, the transceiver 212 of the lidar system 102 on the vehicle 104 transmits for the pixel 306-11 the transmit signal 302-11. The transmit signal 302-11 for the frame 308-2 has a second waveform, which includes a second frequency modulation and a second amplitude modulation. At least one of the second amplitude modulation and the second frequency modulation is different than the first amplitude modulation and the first frequency modulation, respectively.

At 610, a second return signal is received. The second return signal is a version of the second transmit signal reflected by the object. For example, the transceiver 212 of the lidar system 102 on the vehicle 104 receives the return signal 304-11. The return signal 304-11 is a reflection of the transmit signal 302-11 reflected by the object 108-1.

At 612, a second beat signal is generated by mixing the second return signal with the second transmit signal. At least one of a center peak or a sideband peak of the second beat signal is different than a center peak or a sideband peak of the first return signal, respectively. For example, the lidar system 102 mixes the return signal 304-11 with the transmit signal 302-11 in the mixer 502 to generate the beat signal 424 for the subsequent frame 308-2, as shown in FIG. 4. The center frequency and the sideband frequencies of the beat signal 424-11 for the subsequent frame 308-2 are different than the center frequency and the sideband frequencies of the beat signal 424-11 for the initial frame 308-1, as depicted in graphs 500-2 and 500-3 of FIG. 5-1.

At 614, the second beat signal is compared to the first beat signal to increase a confidence in detecting the object or in determining a characteristic of the object. For example, the lidar system 102 compares the beat signal 424 for the subsequent frame 308-2 to the beat signal 424 for the initial frame 308-1. The comparison increases the confidence of the lidar system 102 in detecting the object 108-1 or in determining a characteristic of the object 108-1.

EXAMPLES

In the following section, examples are provided.

Example 1: A method performed by a frequency-modulated continuous-wave lidar system comprising: during an initial frame of two consecutive frames: transmitting a first transmit signal for an initial pixel of two consecutive pixels having a first waveform that comprises a first frequency modulation, a first amplitude modulation, or a combination thereof; receiving a first return signal comprising a version of the first transmit signal that is reflected by an object; and generating a first beat signal by mixing the first return signal with the first transmit signal; during a subsequent frame of the two consecutive frames: transmitting a second transmit signal for the same initial pixel having a second waveform that comprises a second frequency modulation, a second amplitude modulation, or a combination thereof, at least one of the second frequency modulation and the second amplitude modulation having a different modulation than the first frequency modulation and the first amplitude modulation, respectively; receiving a second return signal comprising a version of the second transmit signal that is reflected by the object; and generating a second beat signal by mixing the second return signal with the second transmit signal, at least one of a center peak or a sideband peak of the second beat signal having a different frequency than a center peak or a sideband peak of the first beat signal, respectively; and comparing the second beat signal to the first beat signal to increase a confidence in detecting the object or in determining a characteristic of the object.

Example 2: The method of example 1, further comprising: during the initial frame: transmitting a third transmit signal for a subsequent pixel of the two consecutive pixels having a third waveform that comprises a third frequency modulation, a third amplitude modulation, or a combination thereof; receiving a third return signal comprising a version of the third transmit signal that is reflected by another object; and generating a third beat signal by mixing the third return signal with the third transmit signal; during the subsequent frame: transmitting a fourth transmit signal for the subsequent pixel having a fourth waveform that comprises a fourth frequency modulation, a fourth amplitude modulation, or a combination thereof, at least one of the fourth frequency modulation and the fourth amplitude modulation having a different modulation than the third frequency modulation and the third amplitude modulation, respectively; receiving a fourth return signal comprising a version of the fourth transmit signal that is reflected by the other object; and generating a fourth beat signal by mixing the fourth return signal with the fourth transmit signal, wherein: at least one of a center peak or a sideband peak of the fourth beat signal includes a different frequency than a center peak or a sideband peak of the third beat signal, respectively; at least one of the third frequency modulation and the third amplitude modulation has a different modulation than the first frequency modulation and the first amplitude modulation, respectively; and at least one of the fourth frequency modulation and the fourth amplitude modulation has a different modulation than the second frequency modulation and the second amplitude modulation, respectively; and comparing the fourth beat signal to the third beat signal to increase a confidence in detecting the other object or in determining a characteristic of the other object.

Example 3: The method of example 2, wherein: the first waveform comprises a first frequency slope and a first amplitude modulation; the second waveform comprises a second frequency slope and a second amplitude modulation; at least one of the second frequency slope or the second amplitude modulation is different than the first frequency slope and the first amplitude modulation, respectively; the third waveform comprises a third frequency slope and a third amplitude modulation; the third frequency slope is equal to the first frequency slope and the third amplitude modulation is different than the first amplitude modulation; the fourth waveform comprises a fourth frequency slope and a fourth amplitude modulation; and the fourth frequency slope is equal to the second frequency slope and the fourth amplitude modulation is equal to or different than the third amplitude modulation.

Example 4: The method of example 3 further comprising: receiving, during a detection window for the initial frame in which at least a portion of the first transmit signal and the third transmit signal are transmitted, the first return signal and the third return signal forming a first composite return signal; generating a first comparison result by comparing in a frequency domain the first composite return signal to a first template signal having the first amplitude modulation; generating a third comparison result by comparing in the frequency domain the first composite return signal to a third template signal having the third amplitude modulation;

determining, based on the first comparison result and the third comparison result, a first respective pixel of the two consecutive pixels that corresponds to the first return signal and a third respective pixel of the two consecutive pixels that corresponds to the third return signal; receiving, during a detection window for the subsequent frame in which at least a portion of the second transmit signal and the fourth transmit signal are transmitted, the second return signal and the fourth return signal, the second return signal and the fourth return signal forming a second composite return signal; generating a second comparison result by comparing in the frequency domain the second composite return signal to a second template signal having the second amplitude modulation; generating a fourth comparison result by comparing in the frequency domain the second composite return signal to a fourth template signal having the fourth amplitude modulation; and determining, based on the second comparison result and the fourth comparison result, a second respective pixel of the two consecutive pixels that corresponds to the second return signal and a fourth respective pixel of the two consecutive pixels that corresponds to the fourth return signal, wherein the comparing in the frequency domain includes a cross-correlation, a convolution, or a match-filtering process.

Example 5: The method of example 1, wherein transmitting the second waveform is effective to move at least one of the center peak or the sideband peak of the second beat signal away from at least one of a noise peak or another beat signal.

Example 6: The method of example 1, wherein: the first waveform comprises at least two chirps with a first chirp pattern; and the second waveform comprises at least two chirps with a second chirp pattern, the second chirp pattern different than the first chirp pattern.

Example 7: The method of example 1, wherein: the first waveform comprises a first frequency slope and a first amplitude modulation; the second waveform comprises a second frequency slope and a second amplitude modulation; and at least one of the second frequency slope is different than the first frequency slope or the second amplitude modulation is different than the first amplitude modulation.

Example 8: The method of example 7, wherein: the first transmit signal has a first waveform duration; the second transmit signal has a second waveform duration; and the second frequency slope is less than the first frequency slope and the second waveform duration is greater than the first waveform duration; or the second frequency slope is greater than the first frequency slope and the second waveform duration is less than the first waveform duration.

Example 9: The method of example 7, further comprising: determining that a signal-to-noise ratio of the first return signal is below a threshold value or that a confidence of the lidar system in associating the first return signal to the initial pixel is below a second threshold value; and adjusting at least one of the second frequency modulation or the second amplitude modulation of the second waveform to increase a confidence of the lidar system in associating the second return signal to the initial pixel, the adjusting of the second frequency modulation resulting in the second frequency modulation being different than the first frequency modulation and the adjusting of the second amplitude modulation resulting in the second amplitude modulation being different than the first amplitude modulation.

Example 10: The method of example 1, further comprising: determining a characteristic of the object based on the first beat signal and the second beat signal, wherein the characteristic of the object comprises at least one of a distance from the lidar system to the object or a radial velocity of the object relative to the lidar system; and confirming that the characteristic of the object determined based on the second beat signal is approximately the same as the characteristic of the object determined based on the first beat signal.

Example 11: A frequency-modulated continuous-wave lidar system comprising at least one transceiver configured to: during an initial frame of two consecutive frames: transmit a first transmit signal for an initial pixel of two consecutive pixels having a first waveform that comprises a first frequency modulation, a first amplitude modulation, or a combination thereof; receive a first return signal comprising a version of the first transmit signal that is reflected by an object; and generate a first beat signal by mixing the first return signal with the first transmit signal; during a subsequent frame of the two consecutive frames: transmit a second transmit signal for the same initial pixel having a second waveform that comprises a second frequency modulation, a second amplitude modulation, or a combination thereof, at least one of the second frequency modulation and the second amplitude modulation having a different modulation than the first frequency modulation and the first amplitude modulation, respectively; receive a second return signal comprising a version of the second transmit signal that is reflected by the object; and generate a second beat signal by mixing the second return signal with the second transmit signal, at least one of a center peak or a sideband peak of the second beat signal having a different frequency than a center peak or a sideband peak of the first beat signal, respectively; and compare the second beat signal to the first beat signal to increase a confidence in detecting the object or in determining a characteristic of the object.

Example 12: The frequency-modulated continuous-wave lidar system of example 11, wherein the at least one transceiver is further configured to: during the initial frame: transmit a third transmit signal for a subsequent pixel of the two consecutive pixels having a third waveform that comprises a third frequency modulation, a third amplitude modulation, or a combination thereof; receive a third return signal comprising a version of the third transmit signal that is reflected by another object; and generate a third beat signal by mixing the third return signal with the third transmit signal; during the subsequent frame: transmit a fourth transmit signal for the subsequent pixel having a fourth waveform that comprises a fourth frequency modulation, a fourth amplitude modulation, or a combination thereof, at least one of the fourth frequency modulation and the fourth amplitude modulation having a different modulation than the third frequency modulation and the third amplitude modulation, respectively; receive a fourth return signal comprising a version of the fourth transmit signal that is reflected by the other object; and generate a fourth beat signal by mixing the fourth return signal with the fourth transmit signal, wherein: at least one of a center peak or a sideband peak of the fourth beat signal having a different frequency than a center peak or a sideband peak of the third beat signal, respectively; at least one of the third frequency modulation and the third amplitude modulation has a different modulation than the first frequency modulation and the first amplitude modulation, respectively; and at least one of the fourth frequency modulation and the fourth amplitude modulation has a different modulation than the second frequency modulation and the second amplitude modulation, respectively; and compare the fourth beat signal to the third beat signal to increase a confidence in detecting the other object or in determining a characteristic of the other object.

Example 13: The frequency-modulated continuous-wave lidar system of example 12, wherein: the first waveform comprises a first frequency slope and a first amplitude modulation; the second waveform comprises a second frequency slope and a second amplitude modulation; at least one of the second frequency slope and the second amplitude modulation is different than the first frequency slope and the first amplitude modulation, respectively; the third waveform comprises a third frequency slope and a third amplitude modulation; the third frequency slope is equal to the first frequency slope and the third amplitude modulation is different than the first amplitude modulation; the fourth waveform comprises a fourth frequency slope and a fourth amplitude modulation; and the fourth frequency slope is equal to the second frequency slope and the fourth amplitude modulation is equal to or different than the third amplitude modulation.

Example 14: The frequency-modulated continuous-wave lidar system of example 11, wherein the at least one transceiver is further configured, prior to the transmission of the second transmit signal, to accept a modulation control signal, the modulation control signal specifying a modulation of the second frequency modulation or the second amplitude modulation.

Example 15: The frequency-modulated continuous-wave lidar system of example 11, wherein: the first waveform comprises at least two chirps with a first chirp pattern; and the second waveform comprises at least two chirps with a second chirp pattern, the second chirp pattern different than the first chirp pattern.

Example 16: The frequency-modulated continuous-wave lidar system of example 11, wherein: the first waveform comprises a first frequency slope and a first amplitude modulation; the second waveform comprises a second frequency slope and a second amplitude modulation; and at least one of the second frequency slope is different than the first frequency slope or the second amplitude modulation is different than the first amplitude modulation.

Example 17: The frequency-modulated continuous-wave lidar system of example 16, wherein: the first transmit signal has a first waveform duration; the second transmit signal has a second waveform duration; and the second frequency slope is less than the first frequency slope and the second waveform duration is greater than the first waveform duration; or the second frequency slope is greater than the first frequency slope and the second waveform duration is less than the first waveform duration.

Example 18: The frequency-modulated continuous-wave lidar system of example 16, wherein the at least one transceiver is further configured to: receive an indication that a signal-to-noise ratio of the first return signal is below a threshold value or that a confidence of the lidar system in associating the first return signal to the initial pixel is below a second threshold value; and adjust at least one of the second frequency modulation or the second amplitude modulation of the second waveform to increase a confidence of the lidar system in associating the second return signal to the initial pixel, the adjusting of the second frequency modulation resulting in the second frequency modulation being different than the first frequency modulation and the adjustment of the second amplitude modulation resulting in the second amplitude modulation being different than the first amplitude modulation.

Example 19: The frequency-modulated continuous-wave lidar system of example 11, wherein the second waveform is effective to move at least one of the center peak or the sideband peak of the second beat signal away from at least one of a noise peak or another beat signal.

Example 20: A frequency-modulated continuous-wave lidar system comprising: during an initial frame of two consecutive frames: means for transmitting a first transmit signal for an initial pixel of two consecutive pixels having a first waveform that comprises a first frequency modulation, a first amplitude modulation, or a combination thereof; means for receiving a first return signal comprising a version of the first transmit signal that is reflected by an object; and means for generating a first beat signal by mixing the first return signal with the first transmit signal; during a subsequent frame of the two consecutive frames: means for transmitting a second transmit signal for the same initial pixel having a second waveform that comprises a second frequency modulation, a second amplitude modulation, or a combination thereof, at least one of the second frequency modulation and the second amplitude modulation having a different modulation than the first frequency modulation and the first amplitude modulation, respectively; means for receiving a second return signal comprising a version of the second transmit signal that is reflected by the object; and means for generating a second beat signal by mixing the second return signal with the second transmit signal, at least one of a center peak or a sideband peak of the second beat signal having a different frequency than a center peak or a sideband peak of the first beat signal, respectively; and means for comparing the second beat signal to the first beat signal to increase a confidence in detecting the object or in determining a characteristic of the object.

CONCLUSION

Although implementations of techniques and systems for varying waveforms across frames in FMCW lidar systems have been described in language specific to features and methods thereof, it is to be understood that the subject of the appended claims is not necessarily limited to the specific features or methods described. Rather, the described features and methods are disclosed as example implementations of techniques and systems to vary waveforms across frames in FMCW lidar systems.

What is claimed is:

1. A method performed by a frequency-modulated continuous-wave lidar system comprising:
   during an initial frame of two consecutive frames:
      transmitting a first transmit signal for an initial pixel of two consecutive pixels having a first waveform that comprises a first frequency modulation, a first amplitude modulation, or a combination thereof;
      receiving a first return signal comprising a version of the first transmit signal that is reflected by an object; and
      generating a first beat signal by mixing the first return signal with the first transmit signal;
   during a subsequent frame of the two consecutive frames:
      transmitting a second transmit signal for the same initial pixel having a second waveform that comprises a second frequency modulation, a second amplitude modulation, or a combination thereof, at least one of the second frequency modulation and the second amplitude modulation having a different modulation than the first frequency modulation and the first amplitude modulation, respectively;
      receiving a second return signal comprising a version of the second transmit signal that is reflected by the object; and generating a second beat signal by mixing the second return signal with the second transmit signal, at least one of a center peak or a sideband peak of the second beat signal having a different frequency than a center peak or a sideband peak of the first beat signal, respectively; and comparing the second beat signal to the first beat signal to increase a confidence in detecting the object or in determining a characteristic of the object.

2. The method of claim 1, further comprising:

during the initial frame:

transmitting a third transmit signal for a subsequent pixel of the two consecutive pixels having a third waveform that comprises a third frequency modulation, a third amplitude modulation, or a combination thereof;

receiving a third return signal comprising a version of the third transmit signal that is reflected by another object; and generating a third beat signal by mixing the third return signal with the third transmit signal;

during the subsequent frame:

transmitting a fourth transmit signal for the subsequent pixel having a fourth waveform that comprises a fourth frequency modulation, a fourth amplitude modulation, or a combination thereof, at least one of the fourth frequency modulation and the fourth amplitude modulation having a different modulation than the third frequency modulation and the third amplitude modulation, respectively;

receiving a fourth return signal comprising a version of the fourth transmit signal that is reflected by the other object; and generating a fourth beat signal by mixing the fourth return signal with the fourth transmit signal, wherein:

at least one of a center peak or a sideband peak of the fourth beat signal includes a different frequency than a center peak or a sideband peak of the third beat signal, respectively;

at least one of the third frequency modulation and the third amplitude modulation has a different modulation than the first frequency modulation and the first amplitude modulation, respectively; and at least one of the fourth frequency modulation and the fourth amplitude modulation has a different modulation than the second frequency modulation and the second amplitude modulation, respectively; and comparing the fourth beat signal to the third beat signal to increase a confidence in detecting the other object or in determining a characteristic of the other object.

3. The method of claim 2, wherein:

the first waveform comprises a first frequency slope and a first amplitude modulation;

the second waveform comprises a second frequency slope and a second amplitude modulation;

at least one of the second frequency slope or the second amplitude modulation is different than the first frequency slope and the first amplitude modulation, respectively;

the third waveform comprises a third frequency slope and a third amplitude modulation;

the third frequency slope is equal to the first frequency slope and the third amplitude modulation is different than the first amplitude modulation;

the fourth waveform comprises a fourth frequency slope and a fourth amplitude modulation; and the fourth frequency slope is equal to the second frequency slope and the fourth amplitude modulation is equal to or different than the third amplitude modulation.

4. The method of claim 3 further comprising:

receiving, during a detection window for the initial frame in which at least a portion of the first transmit signal and the third transmit signal are transmitted, the first return signal and the third return signal forming a first composite return signal;

generating a first comparison result by comparing in a frequency domain the first composite return signal to a first template signal having the first amplitude modulation;

generating a third comparison result by comparing in the frequency domain the first composite return signal to a third template signal having the third amplitude modulation;

determining, based on the first comparison result and the third comparison result, a first respective pixel of the two consecutive pixels that corresponds to the first return signal and a third respective pixel of the two consecutive pixels that corresponds to the third return signal;

receiving, during a detection window for the subsequent frame in which at least a portion of the second transmit signal and the fourth transmit signal are transmitted, the second return signal and the fourth return signal, the second return signal and the fourth return signal forming a second composite return signal;

generating a second comparison result by comparing in the frequency domain the second composite return signal to a second template signal having the second amplitude modulation;

generating a fourth comparison result by comparing in the frequency domain the second composite return signal to a fourth template signal having the fourth amplitude modulation; and determining, based on the second comparison result and the fourth comparison result, a second respective pixel of the two consecutive pixels that corresponds to the second return signal and a fourth respective pixel of the two consecutive pixels that corresponds to the fourth return signal, wherein the comparing in the frequency domain includes a cross-correlation, a convolution, or a match-filtering process.

5. The method of claim 1, wherein transmitting the second waveform is effective to move at least one of the center peak or the sideband peak of the second beat signal away from at least one of a noise peak or another beat signal.

6. The method of claim 1, wherein:

the first waveform comprises at least two chirps with a first chirp pattern; and the second waveform comprises at least two chirps with a second chirp pattern, the second chirp pattern different than the first chirp pattern.

7. The method of claim 1, wherein:

the first waveform comprises a first frequency slope and a first amplitude modulation;

the second waveform comprises a second frequency slope and a second amplitude modulation; and at least one of the second frequency slope is different than the first frequency slope or the second amplitude modulation is different than the first amplitude modulation.

8. The method of claim 7, wherein:
the first transmit signal has a first waveform duration;
the second transmit signal has a second waveform duration; and
the second frequency slope is less than the first frequency slope and the second waveform duration is greater than the first waveform duration; or
the second frequency slope is greater than the first frequency slope and the second waveform duration is less than the first waveform duration.

9. The method of claim 7, further comprising:
determining that a signal-to-noise ratio of the first return signal is below a threshold value or that a confidence of the lidar system in associating the first return signal to the initial pixel is below a second threshold value; and
adjusting at least one of the second frequency modulation or the second amplitude modulation of the second waveform to increase a confidence of the lidar system in associating the second return signal to the initial pixel, the adjusting of the second frequency modulation resulting in the second frequency modulation being different than the first frequency modulation and the adjusting of the second amplitude modulation resulting in the second amplitude modulation being different than the first amplitude modulation.

10. The method of claim 1, further comprising:
determining a characteristic of the object based on the first beat signal and the second beat signal, wherein the characteristic of the object comprises at least one of a distance from the lidar system to the object or a radial velocity of the object relative to the lidar system; and
confirming that the characteristic of the object determined based on the second beat signal is approximately the same as the characteristic of the object determined based on the first beat signal.

11. A frequency-modulated continuous-wave lidar system comprising at least one transceiver configured to:
during an initial frame of two consecutive frames:
transmit a first transmit signal for an initial pixel of two consecutive pixels having a first waveform that comprises a first frequency modulation, a first amplitude modulation, or a combination thereof;
receive a first return signal comprising a version of the first transmit signal that is reflected by an object; and
generate a first beat signal by mixing the first return signal with the first transmit signal;
during a subsequent frame of the two consecutive frames:
transmit a second transmit signal for the same initial pixel having a second waveform that comprises a second frequency modulation, a second amplitude modulation, or a combination thereof, at least one of the second frequency modulation and the second amplitude modulation having a different modulation than the first frequency modulation and the first amplitude modulation, respectively;
receive a second return signal comprising a version of the second transmit signal that is reflected by the object; and
generate a second beat signal by mixing the second return signal with the second transmit signal, at least one of a center peak or a sideband peak of the second beat signal having a different frequency than a center peak or a sideband peak of the first beat signal, respectively; and
compare the second beat signal to the first beat signal to increase a confidence in detecting the object or in determining a characteristic of the object.

12. The frequency-modulated continuous-wave lidar system of claim 11, wherein the at least one transceiver is further configured to:
during the initial frame:
transmit a third transmit signal for a subsequent pixel of the two consecutive pixels having a third waveform that comprises a third frequency modulation, a third amplitude modulation, or a combination thereof;
receive a third return signal comprising a version of the third transmit signal that is reflected by another object; and
generate a third beat signal by mixing the third return signal with the third transmit signal;
during the subsequent frame:
transmit a fourth transmit signal for the subsequent pixel having a fourth waveform that comprises a fourth frequency modulation, a fourth amplitude modulation, or a combination thereof, at least one of the fourth frequency modulation and the fourth amplitude modulation having a different modulation than the third frequency modulation and the third amplitude modulation, respectively;
receive a fourth return signal comprising a version of the fourth transmit signal that is reflected by the other object; and
generate a fourth beat signal by mixing the fourth return signal with the fourth transmit signal, wherein:
at least one of a center peak or a sideband peak of the fourth beat signal having a different frequency than a center peak or a sideband peak of the third beat signal, respectively;
at least one of the third frequency modulation and the third amplitude modulation has a different modulation than the first frequency modulation and the first amplitude modulation, respectively; and
at least one of the fourth frequency modulation and the fourth amplitude modulation has a different modulation than the second frequency modulation and the second amplitude modulation, respectively; and
compare the fourth beat signal to the third beat signal to increase a confidence in detecting the other object or in determining a characteristic of the other object.

13. The frequency-modulated continuous-wave lidar system of claim 12, wherein:
the first waveform comprises a first frequency slope and a first amplitude modulation;
the second waveform comprises a second frequency slope and a second amplitude modulation;
at least one of the second frequency slope and the second amplitude modulation is different than the first frequency slope and the first amplitude modulation, respectively;
the third waveform comprises a third frequency slope and a third amplitude modulation;
the third frequency slope is equal to the first frequency slope and the third amplitude modulation is different than the first amplitude modulation;
the fourth waveform comprises a fourth frequency slope and a fourth amplitude modulation; and
the fourth frequency slope is equal to the second frequency slope and the fourth amplitude modulation is equal to or different than the third amplitude modulation.

14. The frequency-modulated continuous-wave lidar system of claim 11, wherein the at least one transceiver is further configured, prior to the transmission of the second transmit signal, to accept a modulation control signal, the modulation control signal specifying a modulation of the second frequency modulation or the second amplitude modulation.

15. The frequency-modulated continuous-wave lidar system of claim 11, wherein:
the first waveform comprises at least two chirps with a first chirp pattern; and
the second waveform comprises at least two chirps with a second chirp pattern, the second chirp pattern different than the first chirp pattern.

16. The frequency-modulated continuous-wave lidar system of claim 11, wherein:
the first waveform comprises a first frequency slope and a first amplitude modulation;
the second waveform comprises a second frequency slope and a second amplitude modulation; and
at least one of the second frequency slope is different than the first frequency slope or the second amplitude modulation is different than the first amplitude modulation.

17. The frequency-modulated continuous-wave lidar system of claim 16, wherein:
the first transmit signal has a first waveform duration;
the second transmit signal has a second waveform duration; and
the second frequency slope is less than the first frequency slope and the second waveform duration is greater than the first waveform duration; or
the second frequency slope is greater than the first frequency slope and the second waveform duration is less than the first waveform duration.

18. The frequency-modulated continuous-wave lidar system of claim 16, wherein the at least one transceiver is further configured to:
receive an indication that a signal-to-noise ratio of the first return signal is below a threshold value or that a confidence of the lidar system in associating the first return signal to the initial pixel is below a second threshold value; and
adjust at least one of the second frequency modulation or the second amplitude modulation of the second waveform to increase a confidence of the lidar system in associating the second return signal to the initial pixel, the adjusting of the second frequency modulation resulting in the second frequency modulation being different than the first frequency modulation and the adjustment of the second amplitude modulation resulting in the second amplitude modulation being different than the first amplitude modulation.

19. The frequency-modulated continuous-wave lidar system of claim 11, wherein the second waveform is effective to move at least one of the center peak or the sideband peak of the second beat signal away from at least one of a noise peak or another beat signal.

20. A frequency-modulated continuous-wave lidar system comprising:
during an initial frame of two consecutive frames:
means for transmitting a first transmit signal for an initial pixel of two consecutive pixels having a first waveform that comprises a first frequency modulation, a first amplitude modulation, or a combination thereof;
means for receiving a first return signal comprising a version of the first transmit signal that is reflected by an object; and
means for generating a first beat signal by mixing the first return signal with the first transmit signal;
during a subsequent frame of the two consecutive frames:
means for transmitting a second transmit signal for the same initial pixel having a second waveform that comprises a second frequency modulation, a second amplitude modulation, or a combination thereof, at least one of the second frequency modulation and the second amplitude modulation having a different modulation than the first frequency modulation and the first amplitude modulation, respectively;
means for receiving a second return signal comprising a version of the second transmit signal that is reflected by the object; and
means for generating a second beat signal by mixing the second return signal with the second transmit signal, at least one of a center peak or a sideband peak of the second beat signal having a different frequency than a center peak or a sideband peak of the first beat signal, respectively; and
means for comparing the second beat signal to the first beat signal to increase a confidence in detecting the object or in determining a characteristic of the object.

* * * * *